United States Patent
Yamamoto et al.

[11] Patent Number: 6,088,532
[45] Date of Patent: *Jul. 11, 2000

[54] IMAGE SIGNAL READING OPERATION CONTROL DEVICE

[75] Inventors: Yasuhiro Yamamoto; Tahei Morisawa, both of Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/580,684

[22] Filed: Dec. 29, 1995

[30] Foreign Application Priority Data

| Jan. 6, 1995 | [JP] | Japan | 7-016551 |
|---|---|---|---|
| Jan. 6, 1995 | [JP] | Japan | 7-016552 |
| Jan. 6, 1995 | [JP] | Japan | 7-016553 |
| Jan. 6, 1995 | [JP] | Japan | 7-016554 |
| Jan. 6, 1995 | [JP] | Japan | 7-016555 |
| Jan. 6, 1995 | [JP] | Japan | 7-016556 |

[51] Int. Cl.$^7$ .......................... G03B 17/50; G03B 17/48; G03B 19/00
[52] U.S. Cl. .............................. 396/30; 396/429
[58] Field of Search .................... 396/30, 429, 430; 348/202, 297, 96–100, 102–103, 110; 358/506, 487, 497, 486, 474, 509, 510, 475, 480

[56] References Cited

U.S. PATENT DOCUMENTS

| 4,689,691 | 8/1987 | Isogai et al. | 358/280 |
|---|---|---|---|
| 4,804,975 | 2/1989 | Yip | 346/76 L |
| 4,893,196 | 1/1990 | Koshiyouji et al. | 358/474 |
| 4,945,423 | 7/1990 | Takanashi et al. | 358/300 |
| 5,283,668 | 2/1994 | Hiramatsu | 358/474 |
| 5,424,156 | 6/1995 | Aoki et al. | |
| 5,516,607 | 5/1996 | Iijima et al. | 430/20 |
| 5,521,748 | 5/1996 | Sarraf | 359/521 |
| 5,539,532 | 7/1996 | Watanabe | 358/443 |
| 5,631,700 | 5/1997 | Aoki | 348/222 |
| 5,646,746 | 7/1997 | Tazawa et al. | 358/471 |
| 5,652,618 | 7/1997 | Nanba | 348/96 |
| 5,684,601 | 11/1997 | Endo | 358/298 |
| 5,691,824 | 11/1997 | Haded et al. | 358/487 |
| 5,708,472 | 1/1998 | Morisawa et al. | 348/373 |
| 5,724,160 | 3/1998 | Brandestini et al. | 358/475 |
| 5,739,849 | 4/1998 | Aoki et al. | 348/207 |
| 5,760,924 | 6/1998 | Takahara et al. | 358/474 |
| 5,805,945 | 9/1998 | Aoki | 396/429 |
| 5,808,675 | 9/1998 | Yamamoto | 348/294 |
| 5,842,050 | 11/1998 | Aoki | 396/30 |
| 5,857,125 | 1/1999 | Morisawa | 396/429 |
| 5,905,526 | 5/1999 | Sato | 348/96 |

FOREIGN PATENT DOCUMENTS

| 0327236 | 8/1989 | European Pat. Off. . |
|---|---|---|
| 2-29081 | 1/1990 | Japan . |
| 5-2280 | 1/1993 | Japan . |
| 5-24706 | 4/1993 | Japan . |
| 5150251 | 6/1993 | Japan . |
| 6313894 | 11/1994 | Japan . |

*Primary Examiner*—Safet Metjahic
*Assistant Examiner*—Christopher Mahoney
*Attorney, Agent, or Firm*—Greenblum & Bernstein, P.L.C.

[57] ABSTRACT

An image signal reading operation control device has an electro-developing recording medium to electronically develop an image formed by a photographing optical system. The image is read out by a line sensor with the electro-developing recording medium being illuminated by a light source. Namely, pixel signals arranged along a horizontal scanning line are read by the line sensor while the line sensor is set at a predetermined position, and then the line sensor is moved in a direction perpendicular to the horizontal scanning line by a predetermined amount. When the image is read out by the line sensor, the light source is displaced along the longitudinal direction of the line sensor.

26 Claims, 26 Drawing Sheets

IMAGE SIGNAL READING OPERATION CONTROL DEVICE

BACKGROUND OF THE INVENTION

1. Field of the Invention

The present invention relates to a device which is provided in an electronic still video camera, for example, and which electronically develops an image on a recording medium, and reads the image from the recording medium.

2. Description of the Related Art

Conventionally, silver halide photographic material is generally used as a material for recording an optical image. Silver halide photographic material has high optical sensitivity and high resolution, and the economical efficiency thereof is excellent. However, silver halide photographic material has drawbacks in that not only is the developing process cumbersome but also a visible image cannot be obtained at the same time as photography. A dry-type developing method has been developed to simplify the developing process. However, simultaneous development in which a visible image is obtained upon photography is impossible in the dry-type developing method.

On the other hand, as non-silver-halide photographic materials, there are known electrophotographic materials, diazotype photographic materials and free-radical photographic materials and so on. In these materials, however, there is no material which has advantageous characteristics like silver halide photographic material, while being able to simultaneously develop and keep a visible image. Note that, electrophotographic materials have been used mainly in copying machines, since they can perform dry-type development and can simultaneously develop an electrostatic latent image, which is obtained by exposure, using toner.

In such electrophotographic materials, recently, a photographic material has been developed in which a recording material made of the photographic material is electronically and directly developed similarly to a silver halide photographic material, so that the developed visible image can be immediately seen or recorded. Such a recording material in which a visible image is electronically developed is referred to as an electro-developing recording material in this specification.

Japanese Unexamined Patent Publication No. 5-2280 and U.S. Pat. No. 5,424,156, for example, discloses a recording material which is a combination of an electrostatic information recording material and an electric charge keeping medium, the electrostatic information recording material having a photoconducting layer and an inorganic oxide material layer, and the electric charge keeping medium having a liquid crystal display. In this structure, when the electrostatic information recording material is exposed while an electric voltage is applied to the electrostatic information recording material and the electric charge keeping medium, electric charge in accordance with the amount of incident light is generated in the electrostatic information recording material. Since the intensity of electric field applied to the liquid crystal display facing the electrostatic information recording material is varied in accordance with the generated electric charge, an image corresponding to the amount of light distribution is indicated or developed on the liquid crystal display.

The image kept by the electro-developing recording medium may be read out through an optical sensor, and a light source may be provided to illuminate the electro-developing recording medium so that the optical sensor can read the image. In such a construction, however, if the light distribution characteristics of the light source are not uniform along the optical sensor, the image cannot be exactly read out by the optical sensor. Therefore, the image signal, which is generated by the optical sensor in accordance with the image, should be subjected to a correction process, which is complicated, so that the effect of the light distribution characteristics is reduced. Therefore, a time for which the correction process is performed is long.

If the optical sensor is a line sensor, the line sensor is intermittently moved along the electro-developing recording medium, and thus a reading operation, in which a part of the image is read by the line sensor, and a discharging operation, in which residual electric charge is discharged from the line sensor, are alternately carried out. Therefore, it takes a long time to read the image from the electro-developing recording medium.

Further, the device, in which the light source and the optical sensor are provided around the electro-developing recording medium, is bulky, and thus there is a limit in miniturizing the device.

On the other hand, a plurality of primary color images can be formed on the electro-developing recording medium through a dichroic optical member, and the color images can be read out through a single line sensor by scanning the line sensor along the electro-developing recording medium. In such a construction, however, a large storage memory must be provided for temporarily storing each of the color images. As a result, the time for the scanning operation takes too long.

In the device having the large storage memory, in a state in which the image developed by the electro-developing recording medium is not read out therefrom, the large storage memory is not used. Namely, the working ratio of the large storage memory is not high.

SUMMARY OF THE INVENTION

Therefore, an object of the present invention is to provide an image signal reading operation control device by which the image developed on the electro-developing recording medium is exactly read out and the complexity of the correction process is reduced, even if the light distribution of a light source is not uniform.

According to the present invention, there is provided an image signal reading operation control device comprising an electro-developing recording medium, a light source, a sensor and displacing means.

The electro-developing recording medium electronically develops an image formed thereon. The light source illuminates the electro-developing recording medium. The sensor reads the image illuminated by the light source. The sensor generates pixel signals aligned in a longitudinal direction thereof, in accordance with the image read by the sensor. The displacing means displaces the light source along the longitudinal direction while the sensor reads the image.

Another object of the present invention is to provide an image signal reading operation control device by which the time for reading the image from the electro-developing recording medium is shortened.

According to the present invention, there is provided an image signal reading operation control device comprising an electro-developing recording medium, a line sensor, moving means, reading means and control means.

The electro-developing recording medium electronically develops an image formed thereon. The line sensor senses the image developed on the electro-developing recording medium. The line sensor generates pixel signals aligned in a longitudinal direction thereof, in accordance with the image sensed by the line sensor. The moving means moves the line sensor in a scanning direction different from the longitudinal direction, from a first position to a second position. The reading means reads out the pixel signals from the line sensor when the line sensor reaches the second position. The control means controls a moving speed at which the line sensor is moved by the moving means. The controlling means changes the moving speed while the line sensor is moved from the first position to the second position.

A further object of the present invention is to provide an image signal reading operation control device which is miniturized.

According to the present invention, there is provided an image signal reading operation control device comprising an electro-developing recording medium, a light source, a mirror, a line sensor and a scanning mechanism.

The electro-developing recording medium electronically develops an image formed thereon. The light source illuminates the electro-developing recording medium. The mirror is disposed in front of the electro-developing recording medium so that light outputted by the light source is led to the electro-developing recording medium. The line sensor is disposed opposed to the mirror with respect to the electro-developing recording medium. The line sensor senses the light passing through the electro-developing recording medium. The scanning mechanism moves the mirror and the line sensor in a scanning direction different from a longitudinal direction of the line sensor.

Still a further object of the present invention is to provide an image signal reading operation control device by which a color image can be read out from the electro-developing recording medium and can be stored in an image data recording medium, without providing a large storage memory, and further wherein the processing time is short.

According to the present invention, there is provided an image signal reading operation control device comprising an electro-developing recording medium, forming means, a plurality of line sensors, reading means and storing means.

The electro-developing recording medium electronically develops an image formed thereon, and has a plurality of recording areas. The forming means forms a color image on each of the recording areas. The line sensors move along the electro-developing recording medium, so that each of the line sensors reads the color image. Each of the line sensors generates pixel signals corresponding to the color image. The reading means reads out the pixel signals from the line sensors. The storing means stores the pixel signals in an image data recording medium.

An other object of the present invention is to provide an image signal reading operation control device by which a color image can be read out from the electro-developing recording medium and can be stored in an image data recording medium, without providing a large storage memory.

According to the present invention, there is provided an image signal reading operation control device comprising an electro-developing recording medium, forming means, a single line sensor, a memory and recording means.

The electro-developing recording medium electronically develops an image formed thereon, and has first and second recording areas. The forming means forms first and second color images on the first and second recording areas, respectively. The single line sensor is moved along the electro-developing recording medium, so that the line sensor reads the first and second color images. The line sensor generates first and second pixel signals corresponding to the first and second color images, respectively. The memory is provided for storing the first pixel signals. The recording means records the first and second pixel signals in an image data recording medium. The recording means reads the first pixel signals from the memory to store the first pixel signals in the image data recording medium, and reads the second pixel signals from the line sensor to store the second pixel signals in the image data recording medium.

A still further object of the present invention is to provide an image signal reading operation control device by which the working ratio of the large storage memory is improved.

According to the present invention, there is provided an image signal reading operation control device comprising an electro-developing recording medium, a line sensor, moving means, a mass memory and control means.

The electro-developing recording medium electronically develops an image formed thereon. The line sensor senses the image developed on the electro-developing recording medium. The moving means moves the line sensor along the electro-developing recording medium. The mass memory stores an image signal correspoding to the image, and can be used as an external memory of a computer. The control means controls a storing operation, in which a signal is stored in the mass memory, in accordance with a command signal inputted from the computer.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
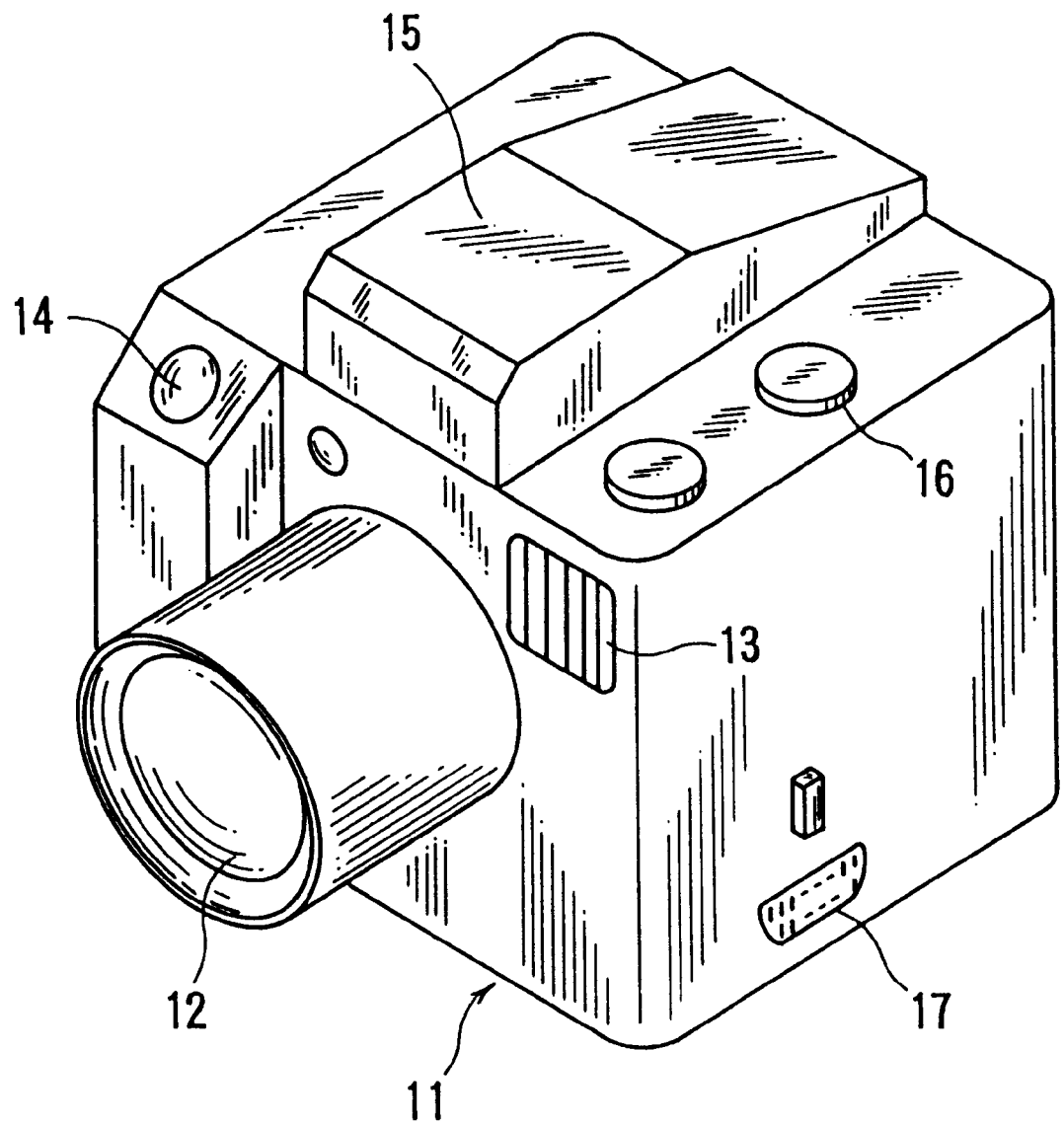
FIG. 1 is a perspective view showing a still video camera to which an image signal reading operation control device of a first embodiment of the present invention is applied.

FIG. 1 is an external view of a still video camera to which an image signal reading operation control device of a first embodiment according to the present invention is applied.

When viewing a camera body 11 from a front side in FIG. 1, on the front surface of the camera body 11, a photographing optical system 12 including a photographing lens system and so on is provided on approximately the central portion of the front surface, and an electronic flash 13 is disposed on a portion to the right of and above the photographing optical system 12. A release switch 14 is provided on the side opposite to the electronic flash 13. On the upper surface of the camera body 11, a view finder 15 is provided at the center portion thereof, and operation switches including a scan start switch 16 are provided on a side of the view finder 15. On a side surface of the camera body 11, an output terminal 17 is formed on a lower portion thereof so that an image signal obtained by the camera is outputted to an external recording device.

Figure 2:
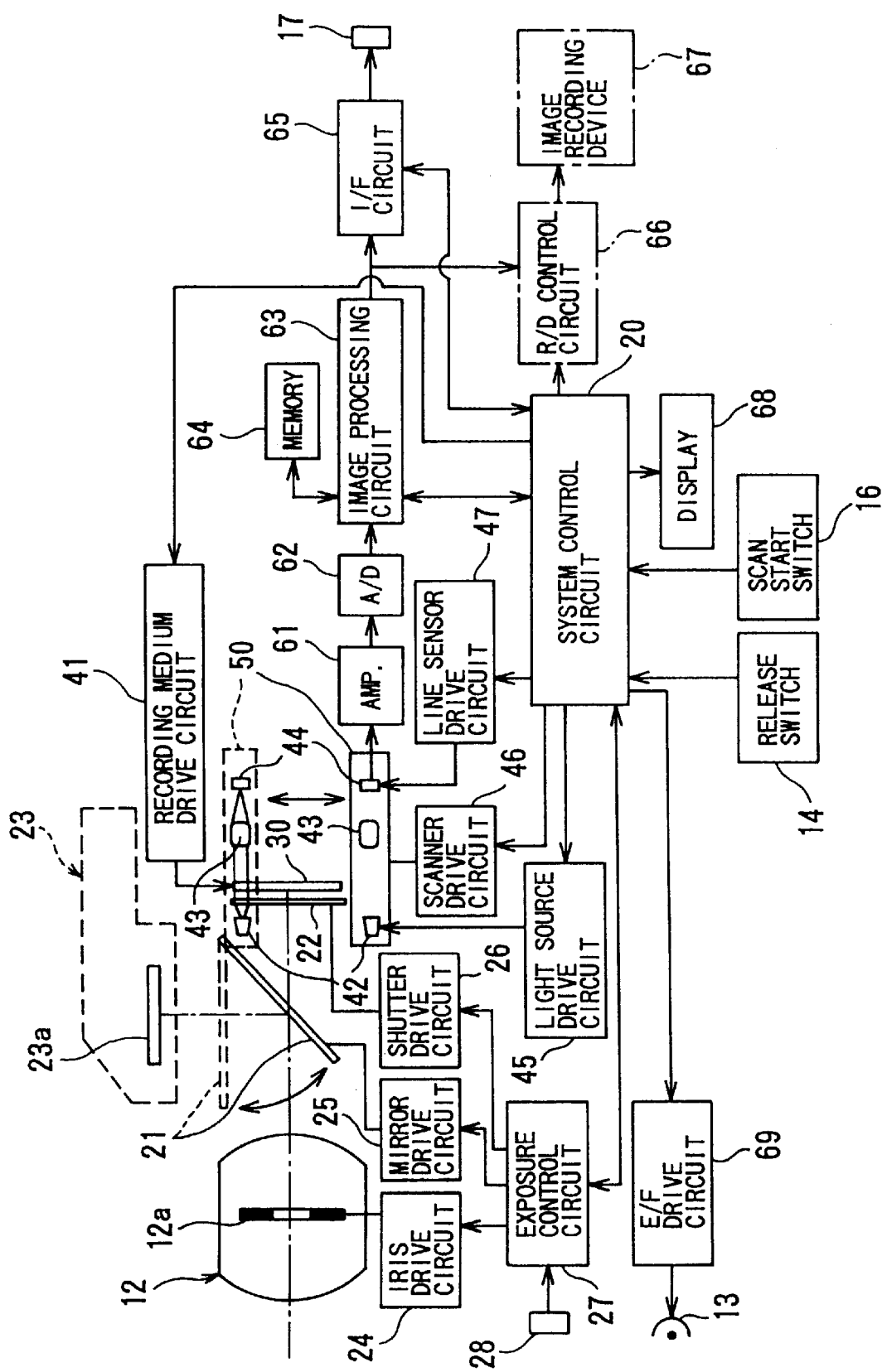
FIG. 2 is a block diagram of the still video camera.

FIG. 2 is a block diagram of the still video camera, in which a system control circuit 20 including a microcomputer or micro-processor is mounted to control the still video camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a, included in a view finder optical system 23, is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the system control circuit 20. Namely, when an exposure is controlled, the opening degree of the aperture 12a is adjusted by the iris drive circuit 24, under control of the exposure control circuit 27 based on an output signal of a photometry sensor 28.

The quick return mirror 21 is usually set to a down position (an inclining position shown by the solid line in the drawing), so that a light beam passing through the photographing optical system 12 is led to the view-finder optical system 23 so that an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is usually closed, and upon a photographing operation, the shutter 22 is opened for a predetermined period by the shutter drive circuit 26 under control of the exposure control circuit 27, and thus, the light beam passing through the photographing optical system 12 enters a light receiving surface of the electro-developing recording medium 30, thus forming a two-dimensional image thereon.

An electric voltage is applied to the electro-developing recording medium 30 under control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A scanning mechanism 50 is provided close to the electro-developing recording medium 30. A light source 42 includes an LED (light emitting diode) and a collimator lens, and emits a parallel light beam. The light source 42, a scanner optical system 43 and a line sensor 44 are supported by the scanning mechanism 50, and are moved along the electro-developing recording material 30 by a scanning operation of the scanning mechanism 50.

The line sensor 44 may be a one dimensional CCD sensor of 2000 pixels, for example. The line sensor 44 may be of suitable length to completely cover and extend over one horizontal scanning line of the image formed on electro-developing recording medium 30. The line sensor 44 serves as a photoelectric-conversion device, which converts an optical image to an electric signal. The light source 42 can be moved along the front surface of the shutter 22 or the front surface of the electro-developing recording medium 30, and the line sensor 44 can be moved along the rear surface of the electro-developing recording medium 30. The scanner optical system 43 is disposed between the light source 42 and the line sensor 44. When scanning is carried out by the scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44 due to an operation of the scanner optical system 43. Namely, the scanner optical system 43 is disposed on the optical path of the light beam which passes through the electro-developing recording medium 30, and the line sensor 44 is moved in an imaging plane, on which an image is formed, by the scanning optical system 43.

ON and OFF control of the light source 42 is performed by a light source drive circuit 45. Control of the reading operation of the pixel signals generated in the line sensor 44 is carried out by a line sensor drive circuit 47. Control of the movement of the scanning mechanism 50 is performed by a scanner drive circuit 46. The circuits 45, 46 and 47 are controlled by the system control circuit 20.

Pixels signals read out from the line sensor 44 are amplified by an amplifier 61, and converted to a digital signal by an A/D converter 62. The digital pixel signals are subjected to a shading correction, a gamma correction and so on by an image processing circuit 63 under control of the system control circuit 20, and then, are temporarily stored in a memory 64. The memory includes an EEPROM in which correction data for the shading correction is stored. Note that the memory 64 may have a storage capacity equal to one horizontal scanning line outputted from the line sensor 44, or may have a storage capacity of one frame's worth of image signals.

The pixel signals outputted from the memory 64 are inputted into an interface circuit 65 through the image process circuit 63, so that the pixel signals are subjected to a predetermined process such as a format conversion, and can be outputted to an external computer (not shown) through the output terminal 17. The pixel signals outputted from the image process circuit 63 are subjected to a predetermined process such as an image compression and a format conversion in a recording device control circuit 66, so that the pixel signals can be recorded on a recording medium such as an IC memory card, for example, in an image recording device 67. The recording device control circuit 66 and the image recording device 67 may be attached on a bottom surface of the camera. Electrical connectors (not shown) may be provided at the bottom surface of the camera to connect the recording device control circuit 66 to the system control circuit 20 and the image processing circuit 63. The interface circuit 65 and the recording device control circuit 66 are operated in accordance with a command signal outputted from the system control circuit 20.

The release switch 14 and the scan start switch 16 are connected to the system control circuit 20, and operations such as a photography operation, a reading operation and so on are carried out in accordance with an operation of the switch 14 or 16. A display device 68 for indicating various setting conditions of the still video camera, and an electronic flash drive circuit 69 for performing a flash control of the electronic flash 13 are also connected to the system control circuit 20.

Figure 3:
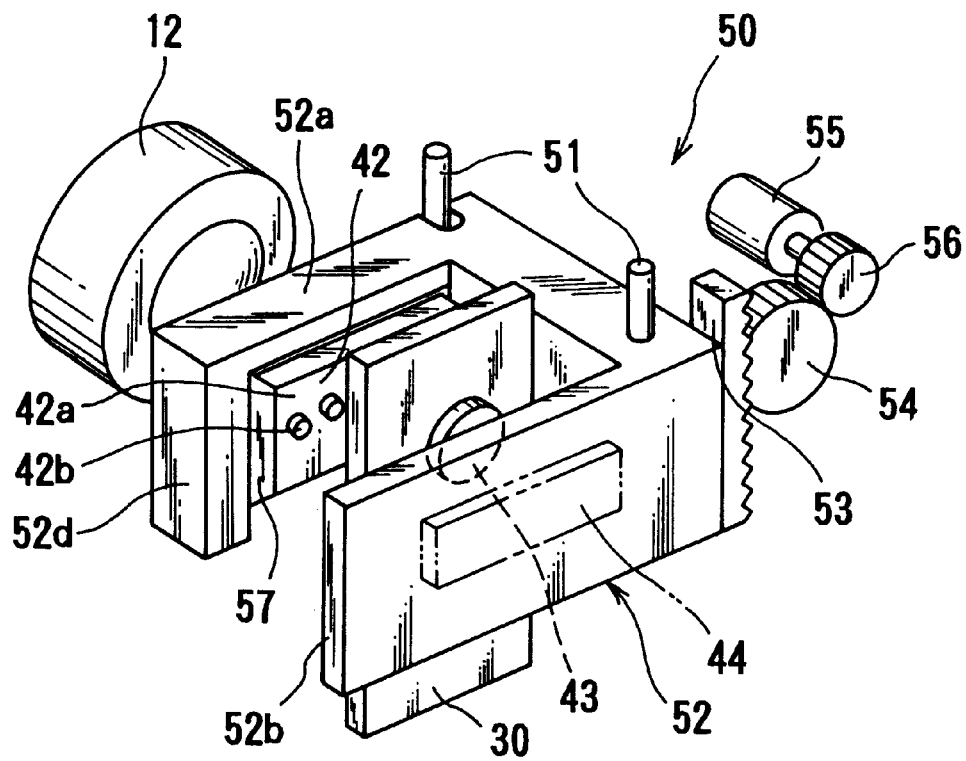
FIG. 3 is a perspective view showing a scanning mechanism and members provided around the mechanism.

FIG. 3 shows the structure of the scanning mechanism 50 and members provided around the mechanism 50.

The scanning mechanism 50 has a moving member 52 which is slidably supported by a pair of guide shafts 51 and has first and second leg portions 52a and 52b. The first leg portion 52a is extended between the quick return mirror 21 and the shutter 22 (see FIG. 2), and the second leg portion 52b is extended behind the electro-developing recording medium 30. The light source 42 is connected to a projection 52d, which is downwardly extended from an end portion of the first leg portion 52a, through a displacing mechanism 57. The scanner optical system 43 is attached to a front surface of the second leg portion 52b through a connecting member (not shown), and the line sensor 44 is provided in a frame formed in the second leg portion 52b. A rack 53 fixed to the moving member 52 is meshed with a pinion 54 which is meshed with a gear 56 provided on an output shaft of a scan drive motor 55.

The light source 42 has a support member 42a connected to the displacing mechanism 57, and a plurality of light-emitting diodes (LED) 42b. The LEDs 42b are arranged in a horizontal direction, and face the line sensor 44. The displacing mechanism 57 is provided with a solenoid including a plunger which is connected to the support member 42a. The plunger can be displaced in a direction, along which the LEDs 42b are arranged, in accordance with a command signal outputted from the light source drive circuit 45 (FIG. 2). The direction is coincident with a longitudinal direction of the line sensor 44. In the other example, as shown in FIG. 4, the light source 42 may have a linear light-emitting source 42c which is extended in parallel to the line sensor 44.

Figure 5:
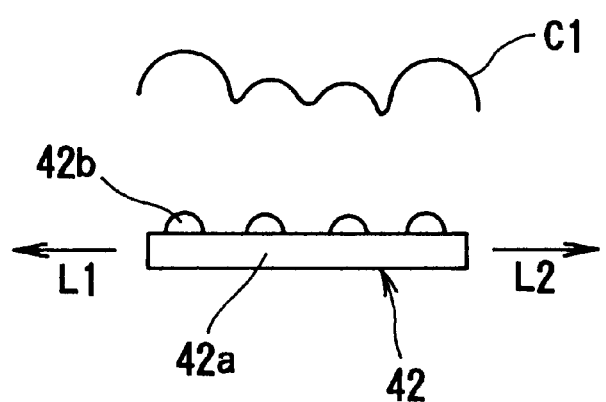
FIG. 5 is a view showing an arrangement of light emitting diodes of a light source.

In an operation other than a photographing operation in which an image is formed on the electro-developing recording medium 30, the moving member 52 is positioned offset from a path between the photographing optical system 12 and the electro-developing recording medium 30, the position being below the electro-developing recording medium 30, for example. When a photographing operation has been completed and an image has been developed in the electro-developing recording medium 30, the scan drive motor 55 is operated, the moving member 52 is moved upward so that a scan of the line sensor 44 is carried out, and the line sensor 44 is moved in a direction perpendicular to the longitudinal direction of the line sensor 44. During this scanning operation, the displacing mechanism 57 is controlled so that the LEDs 42b are displaced by a predetermined distance in a direction shown by an arrow L1 or L2 as shown in FIG. 5. Therefore, the distribution of light illuminating the electro-developing recording medium 30 is controlled to be uniform, even if the light distribution characteristics of the LEDs 42b are not uniform as shown by the line C1.

Figure 4:
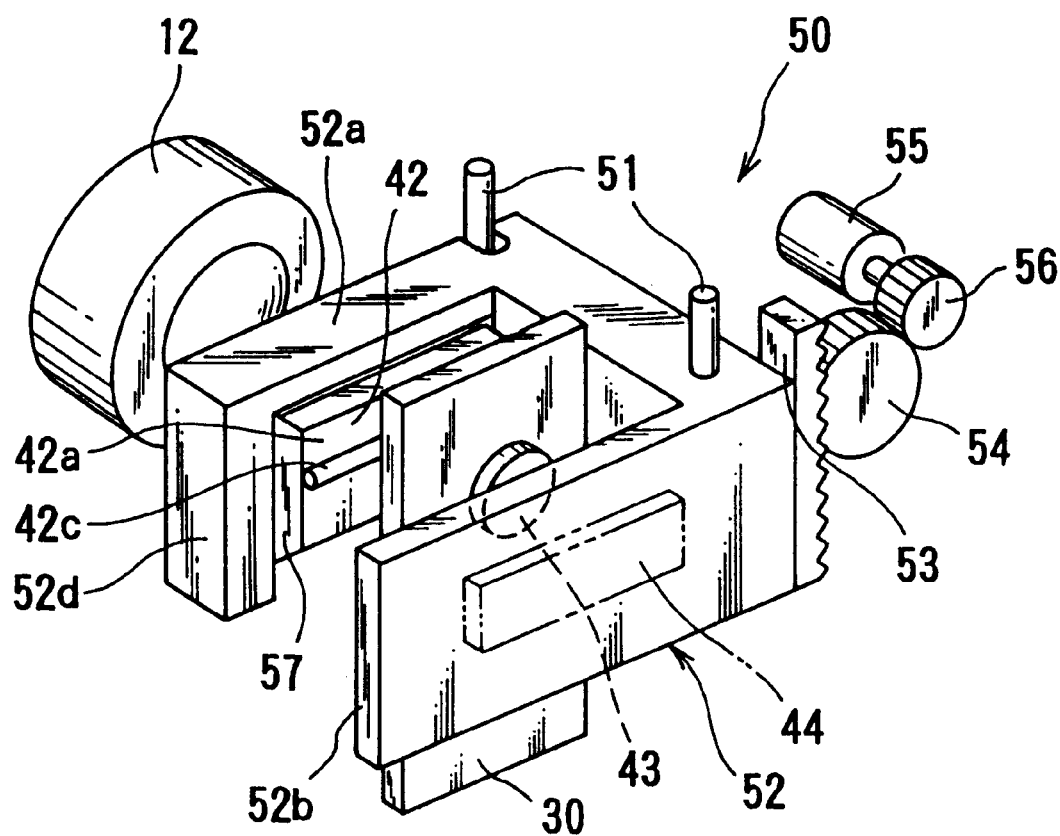
FIG. 4 is a perspective view showing another example of the scanning mechanism and members provided around the mechanism.

In the alternative, the light source 42 may be constructed as shown in FIG. 4. In FIG. 4, the light source 42 includes a single light-emitting source 42c, in place of LEDs 42b, that is provided on the support member 42a and faces the line sensor 44. The single light-emitting source 42c is longitudinal or linear in shape to provide a more uniform light distribution than that provided by the LEDs 42b. The displacing mechanism 57 may still be utilized to move the light source 42 and to even out the light distribution of the single light-emitting source 42c at, for example, the ends thereof.

Figure 6:
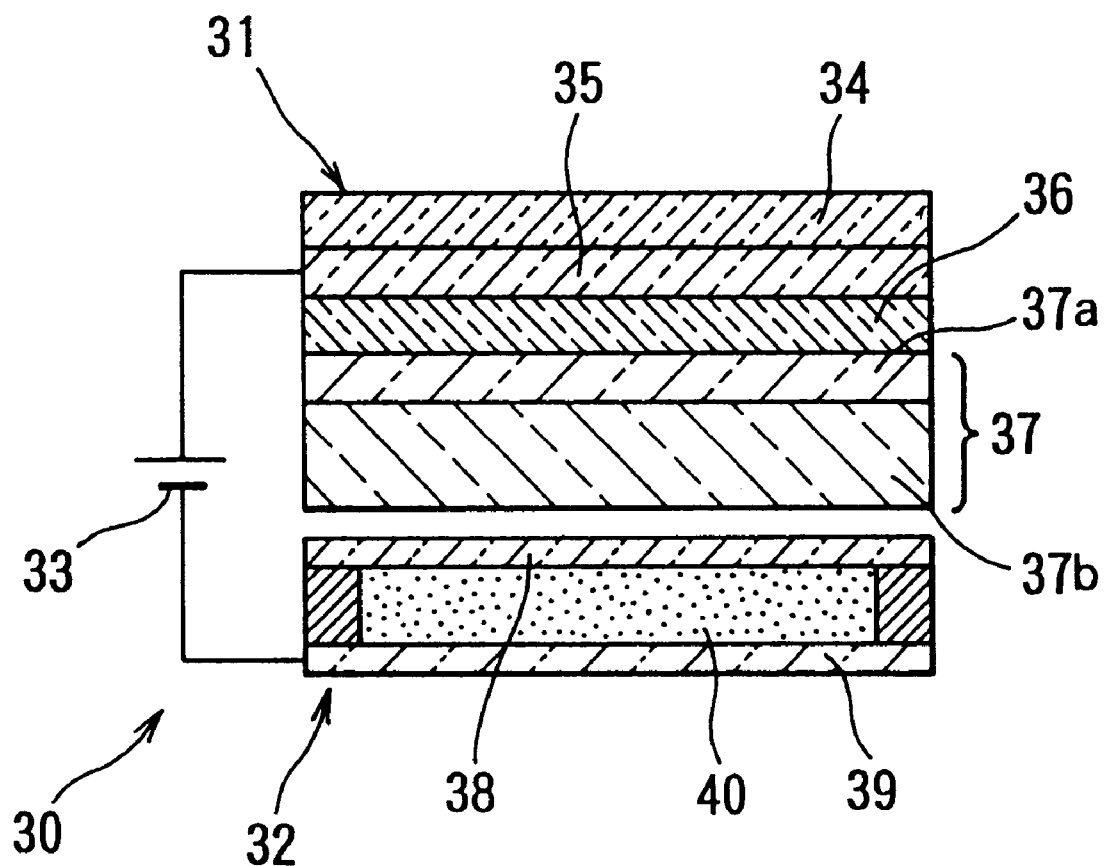
FIG. 6 is a view showing a structure of an electro-developing recording medium.

FIG. 6 shows a structure of the electro-developing recording medium 30, and is the same as that shown in Japanese Unexamined Patent Publication No. 5-2280 and U.S. Pat. No. 5,424,156, the disclosures of which are expressly incorporated herein by reference in their entirety.

The electro-developing recording medium 30 has an electrostatic information recording medium 31 and an electric charge keeping medium 32, and an electric voltage is applied thereto by a power source 33. The electric power source 33 corresponds to the recording medium drive circuit 41, so that an ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36 and a photoconducting layer 37. The photoconducting layer 37 is formed by laminating an electric charge generating layer 37a and an electric charge transferring layer 37b. The electric charge keeping medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge keeping medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an image of an object is developed. Namely, the visible image is generated in accordance with the electric charge.

The electric charge keeping medium 32 is a liquid crystal display having a memory-type liquid crystal, and thus, the developed visible image is kept therein even if the electric field is removed. In the liquid crystal display, the developed visible image can be deleted by heating the liquid crystal display, using a heating device (not shown) at a predetermined temperature. In such a case, the same electric charge keeping medium 32 can be used repeatedly.

Figure 7:
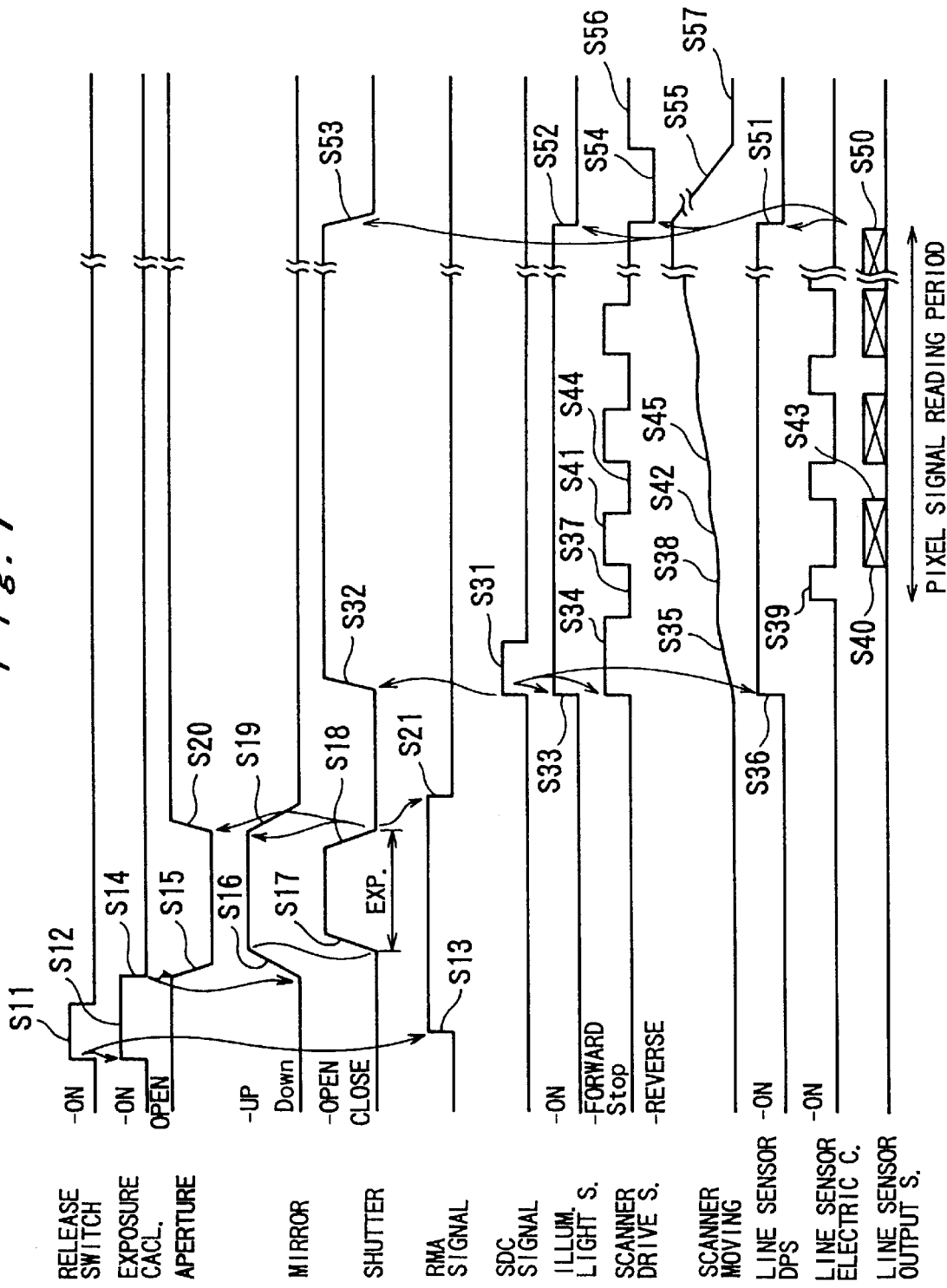
FIG. 7 is a timing chart showing a photographing operation and a reading operation of pixel signals from a line sensor.

FIG. 7 is a timing chart showing a photographing operation and a reading operation of the pixel signals from the line sensor 44.

When it is sensed that the release switch 14 has been depressed (reference S11), an output signal of the photometry sensor 28, i.e., a photometry value, is sensed. An exposure calculation is started based on the photometry value (reference S12). After a predetermined period has passed since the release switch 14 has been depressed, a recording medium activating signal is outputted from the recording medium drive circuit 41 (reference S13), so that the electric power source 33 is turned ON, and thus, an electric voltage is applied to the electrostatic information recording medium 31 and the electric charge keeping medium 32. When it is confirmed that the exposure calculation has been completed (reference S14), then a photographing operation is carried out in accordance with the calculation result.

The opening degree of the aperture 12a is changed from the fully open state to a predetermined opening degree (reference S15), and the quick return mirror 21 is changed from the down condition to the upcondition (reference S16). When it is confirmed that the quick return mirror 21 has been changed to the up-condition and the opening degree adjustment of the aperture 12a has been completed, the shutter is opened (reference S17). When the exposure period determined by the exposure calculation has passed and it is sensed that the exposure has been completed, the shutter 22 is closed (reference S18). By the completion of the closing operation of the shutter 22, the quick return mirror 21 is changed to the down-condition (reference S19) and the aperture 12a is driven to the fully open condition (reference S20). Then, the output of the recording medium activating signal is stopped (reference S21).

Namely, the recording medium activating signal is outputted at least for the period while the shutter 22 is opened, and during this period, a predetermined voltage is applied to the electro-developing recording medium 30. Then, by exposing the electro-developing recording medium 30 under the voltage applied condition, the object image is developed on the electro-developing recording medium 30 as a visible object image. The visible object image is kept even if the output of the recording medium activating signal is stopped.

When it is confirmed that the quick return mirror 21 and the aperture 12a have returned to their initial positions, the operations of the quick return mirror 21 and the aperture 12a are stopped, and thus this routine ends.

Then, when the scan start switch 16 is depressed, a scanning operation of the scanning mechanism 50 is started, and the reading operation described below is executed.

When it is confirmed that a scanner drive command signal has been outputted (reference S31), the shutter 22 is opened (reference 532), and the light source 42 is lit (reference S33). Then, a scanner drive signal is outputted (reference S34), so that the scan drive motor 55 operates in a forward direction, and the moving member 52 of the scanning mechanism 50 starts to move upward from a position below the electro-developing recording medium 30 (reference S35). Then, a line sensor drive power source included in the line sensor drive circuit 47 is turned ON (reference S36).

When it is confirmed that the line sensor 44 is set at a reading start position, then the output of the scanner drive signal is stopped (reference S37), and thus the scan drive motor 55 is stopped (reference S38). This stopping operation is controlled by counting pulse signals, for example, used for rotating the scan drive motor 55.

Then, an exposure of the line sensor 44 is started, and thus electric charge accumulation in the line sensor 44 is performed (reference S39) so that the line sensor 44 generates pixel signals aligned in the longitudinal direction in accordance with an image read by the line sensor 44. When it is confirmed, by sensing that a constant time has passed, for example, that the exposure of the line sensor 44 has been completed, a reading scan of the line sensor 44 and an output operation of pixel signals of one horizontal scanning line from the line sensor 44 are started (reference S40). Then, the scanner drive signal for operating the scan drive motor 55 in a forward direction is outputted (reference S41), so that the moving member 52 starts to move upward (reference S42). During this movement, the pixel signals are stored in the memory 64.

During movement of the moving member 52, when it is confirmed that the reading scan of one horizontal scanning line has been read out and stored in the memory 64, the reading scan is stopped (reference S43). Note that the completion of the reading scan is controlled by counting pulse signals, for example, which are outputted from the line sensor drive circuit 47 to drive the line sensor 44.

When it is confirmed that the line sensor 44 has been set at the position of the next horizontal scanning line, the output of the scanner drive signal is stopped (reference S44), and thus the scan drive motor 55 is stopped (reference S45).

Thus, in this embodiment, the line sensor 44 is repeatedly moved and then stopped after a predetermined time and by a predetermined amount, by the scanning mechanism 50, so that the line sensor 44 moves on the imaging plane of the scanner optical system 43 to scan the image, and pixel signals are read out while the line sensor 44 moves.

When all of the horizontal scanning lines have been read out (reference S50), the drive power source of the line sensor 44 is turned OFF (reference S51), and the light source 42 is turned OFF (reference S52). Then, the shutter 22 is closed (reference S53), and a scanner drive signal for operating the scan drive motor 55 in the rearward direction is outputted (reference S54), and thus the moving member 52 starts to descend (reference S55).

During the descending movement of the moving member 52, when it is confirmed that the line sensor 44 has returned to an initial position away from the electro-developing recording medium 30, the output of the scanner drive signal is stopped (reference S56), so that the scan drive motor 55 is stopped (reference S57). Note that the sensing operation of the initial position is performed based on a signal outputted by an operation in which a part of the moving member 52 traverses a photo-interrupter (not shown).

Figure 8:
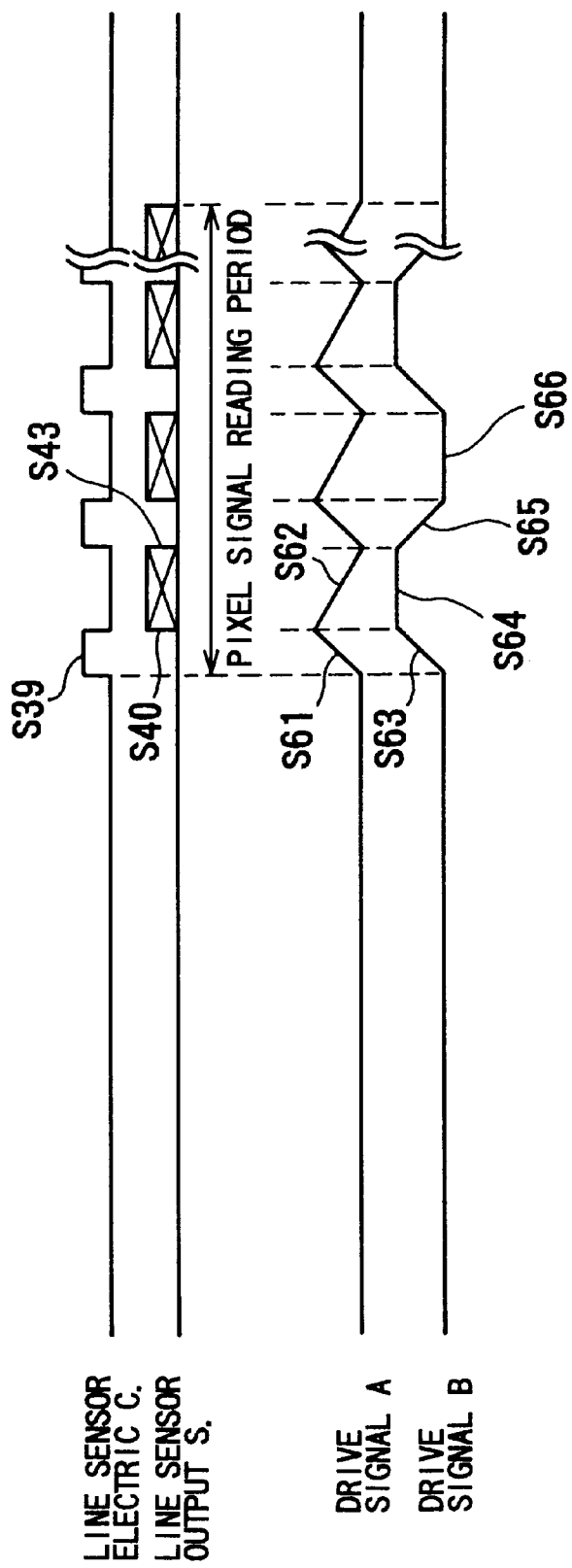
FIG. 8 is a timing chart in which signals for driving a displacing mechanism are shown.

FIG. 8 is a timing chart in which signals for driving the displacing mechanism 57 are shown below the signals for electric charge accumulation in the line sensor 44 and the output signals, which are shown in the timing chart of FIG. 7.

In a first example, the displacing mechanism 57 is driven by a drive signal A. The level of the drive signal A is linearly increased (reference S61) while electric charge accumulation in the line sensor 44 is carried out. After the completion of the electric charge accumulation, the level of the drive signal A is linearly decreased (reference S62) while the pixel signals of one horizontal scanning line are outputted from the line sensor 44. Thus, the drive signal A is periodically changed.

In a second example, the displacing mechanism 57 is driven by a drive signal B. The level of drive signal B is linearly increased (reference S63) while the electric charge accumulation in the line sensor 44 is carried out. After the completion of the electric charge accumulation, the level of drive signal B is kept constant (reference S64) while the pixel signals of one horizontal scanning line are outputted from the line sensor 44. Then, when the next exposure, i.e., the next electric charge accumulation, is started, the level of drive signal B is linearly decreased from the start of the exposure (reference S65), and is kept constant while the pixel signals of one horizontal scanning line are outputted from the line sensor 44 (reference S66). Thus, the drive signal B is periodically changed.

In the first embodiment, when the level of drive signals A and B are increased, the plunger of the displacing mechanism 57 is projected so that the support member 42a of the light source 42 is displaced rightward in FIG. 5. Conversely, when the level of the drive signals A and B are decreased, the plunger is retreated so that the support member 42a is displaced leftward in FIG. 5.

In the first example, while an accumulating operation in which electric charge is accumulated in the line sensor 44 is performed, the light source 42 is displaced always in a first direction, and while the accumulating operation is not performed, the light source 42 is displaced in a second direction opposite to the first direction. Conversely, in the second example, while the accumulating operation is performed, the light source 42 is displaced alternately in the two different directions, and while the accumulating operation is not performed, the light source 42 is stopped. Namely, the light source 42 is displaced in accordance with the accumulating operation of the line sensor 44. Namely, the light source 42 is displaced along the longitudinal direction while the line sensor 44 reads the image.

The amount of displacement of the light source 42 is the distance between two adjacent LEDs 42b, or a half of the distance, for example, so that non-uniformity of the light distribution of the light source 42 is compensated for. Namely, according to the first embodiment, a deviation of the luminance on the light receiving surface of the line sensor 44 is reduced even if the light distribution of the light source 42 is non-uniform along the longitudinal direction of the line sensor 44.

A second embodiment of the present invention is described below. Note that the external view of a still video camera having an image signal generating device of the second embodiment is the same as that of the first embodiment, and the block diagram of the still video camera is the same as that of the first embodiment. Further, the electro-developing recording medium having the same structure as in the first embodiment is used in the second embodiment.

Figure 9:
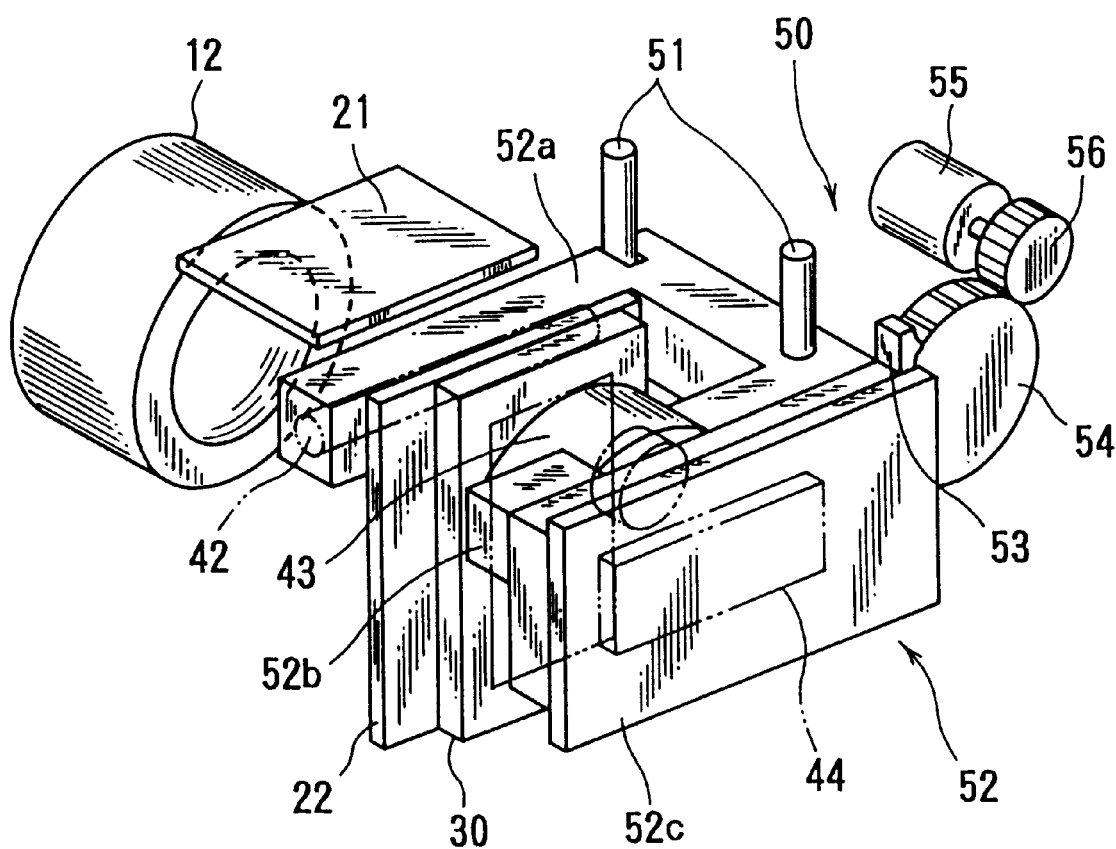
FIG. 9 is a perspective view showing the scanning mechanism and members provided around the mechanism, in a second embodiment.

FIG. 9 shows the structure of the scanning mechanism 50 and members provided around the mechanism 50, in the second embodiment.

The scanning mechanism 50 of this embodiment has basically the same structure as that shown in FIG. 4 which is included in the first embodiment. In the second embodiment, the moving member 52 has the first and second leg portions 52a and 52b and a support portion 52c. The line sensor 44 is attached to the support portion 52c, which is provided behind the second leg portion 52b. The light source 42 is extended in a horizontal direction, and is attached to the first leg portion 52a without the displacing mechanism. The other structures are the same as that shown in FIG. 4.

Figure 10:
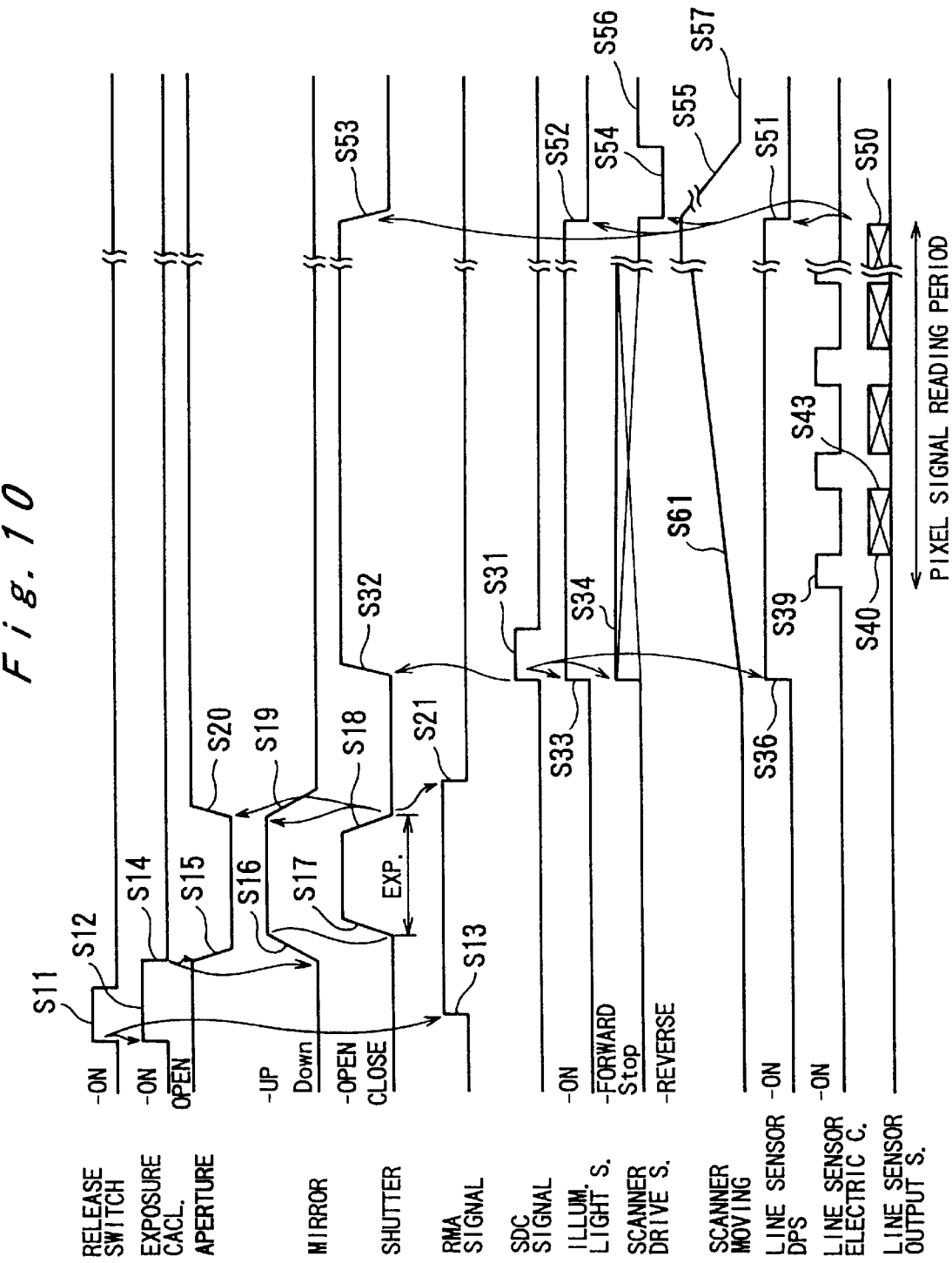
FIG. 10 is a timing chart showing a photographing operation and a reading operation of the pixel signals from the line sensor, in the second embodiment.

FIG. 10 is a timing chart showing a photographing operation and a reading operation of the pixel signals from the line sensor 44, in the second embodiment. The operations in the second embodiment are the same as those of the first embodiment shown in FIGS. 7 and 8 except for the movements of the line sensor 44 and the light source 42.

In the reading operation, the moving member 52 of the scanning mechanism 50 is moved aproximately at a constant speed (reference S61) during which an accumulating operation, in which the line sensor 44 is exposed and electric charge is accumulated therein, and an output operation, in which pixel signals are read out from the line sensor 44, are repeatedly performed. Actually, however, the moving speed of the line sensor 44 is changed periodicaly as described later.

Figure 11:
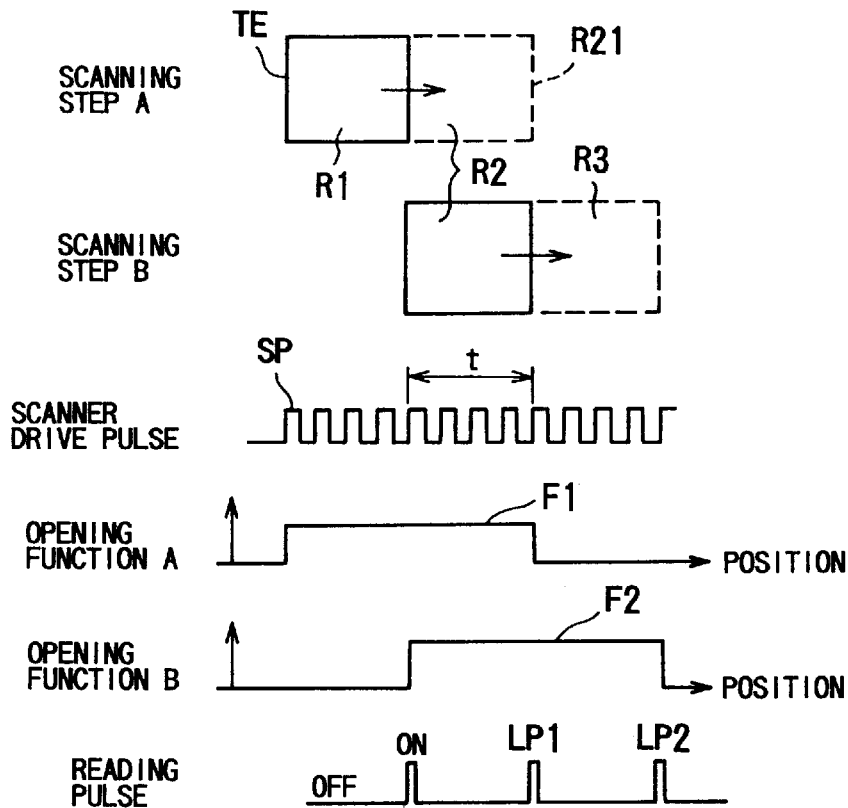
FIG. 11 is a diagram showing a scanning operation in a comparative example.

FIG. 11 shows a scanning operation in a comparative example. In this drawing, rectangles indicated by the references R1, R2 and R3 correspond to a reading area, i.e., a photodiode provided in the line sensor 44. In this comparative example, the line sensor 44 is moved at a constant speed. Namely, a scanner drive pulse SP for driving the scan drive motor 55 (see FIG. 9) is outputted with a constant frequency.

At a first scanning step A, the photodiode reads an image formed in a portion from a first reading area R1 to a second reading area R2, and an image signal corresponding to the image is read out from the photodiode when a reading pulse LP1 is outputted, i.e., when the leading edge of the photodiode becomes coincident with the leading edge R21 of the reading area R2. Similarly, at a second scanning step 8, the photodiode reads an image formed in a portion from the second reading area R2 to a third reading area R3, and an image signal corresponding to the image is read out from the photodiode when a reading pulse LP2 is outputted.

An opening function A at the first scanning step A indicates the opening amount of the photodiode when the photodiode is moved from a first position to a second position. The reference F1 indicates a substantial opening area of the photodiode. In the example shown in FIG. 11, the image signal is uniformly sensed from the first position to the second position. In other words, the image signal is sensed at each portion from the first position to the second position, with a constant ratio.

The image read out in synchronization with the reading pulse LP1 is processed by the image processing circuit 63 or the other circuit, as image data corresponding to the first reading area R1, for example. This data, however, undesireably includes data of the second reading area R2 as well, as described above, and due to this, the accuracy of the image data of the first reading area R1 is lowered.

Conversely, in the second embodiment of the present invention, the moving speed of the line sensor 44 is changed while the photodiode is moved from the reading area R1 corresponding to the first position to the reading area R2 corresponding to the second position, so that the accuracy of the image data is improved, as described below with reference to FIG. 12. The pixel signals are read out from the line sensor 44 when the line sensor 44 reaches the second position, similar to the comparative example.

Figure 12:
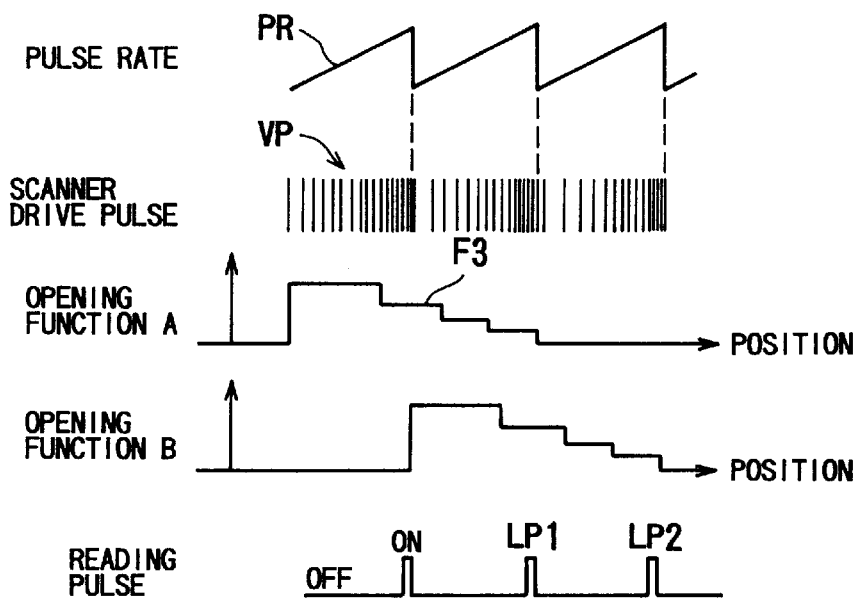
FIG. 12 is a diagram showing a scanning operation in the second embodiment.

Although the scanner drive pulse SP for driving the scan drive motor 55 is outputted with a constant frequency in the comparative example, the pulse rate of the scanner drive pulse VP is linearly increased in one reading area (reference R1, for example, in FIG. 11) as shown by reference PR in the second embodiment of FIG. 12. The rotational speed of the scan drive motor 55 is changed in accordance with the frequency of the drive pulse VP, and thus the moving speed of the photodiode is linearly increased while the trailing edge TE (see FIG. 11) of the photodiode is moved from the starting edge of the reading area R1 to the end edge thereof.

Therefore, an opening function A at the first scanning step A (see FIG. 11) is decreased as the photodiode is moved from the reading area R1 to the reading area R2 (reference F3), and the amount of data of the reading area R2 included in the image data read out in synchronization with the reading pulse LP1 is reduced in comparison with the comparative example. Accordingly, according to the second embodiment, the image data of the reading area R1 is read out with a higher accuracy than in the comparative example.

As described above, since the second embodiment is constructed in such a manner that the image formed on the electro-developing recording medium 30 is read out without stopping the line sensor 44, the process time for reading out the image can be shortened. Further, since the moving speed of the line sensor 44 is increased in such a manner that the moving speed at the second position is higher than that at the first position, an effect, which the image data of the second position exerts on the image data of the first position, is relatively small, so that the accuracy of the image is improved.

A third embodiment of the present invention is described below. Note that an external view of a still video camera having an image signal generating device of the second embodiment is the same as that of the first embodiment, and the electro-developing recording medium having the same structure as in the first embodiment is used in the third embodiment.

Figure 13:
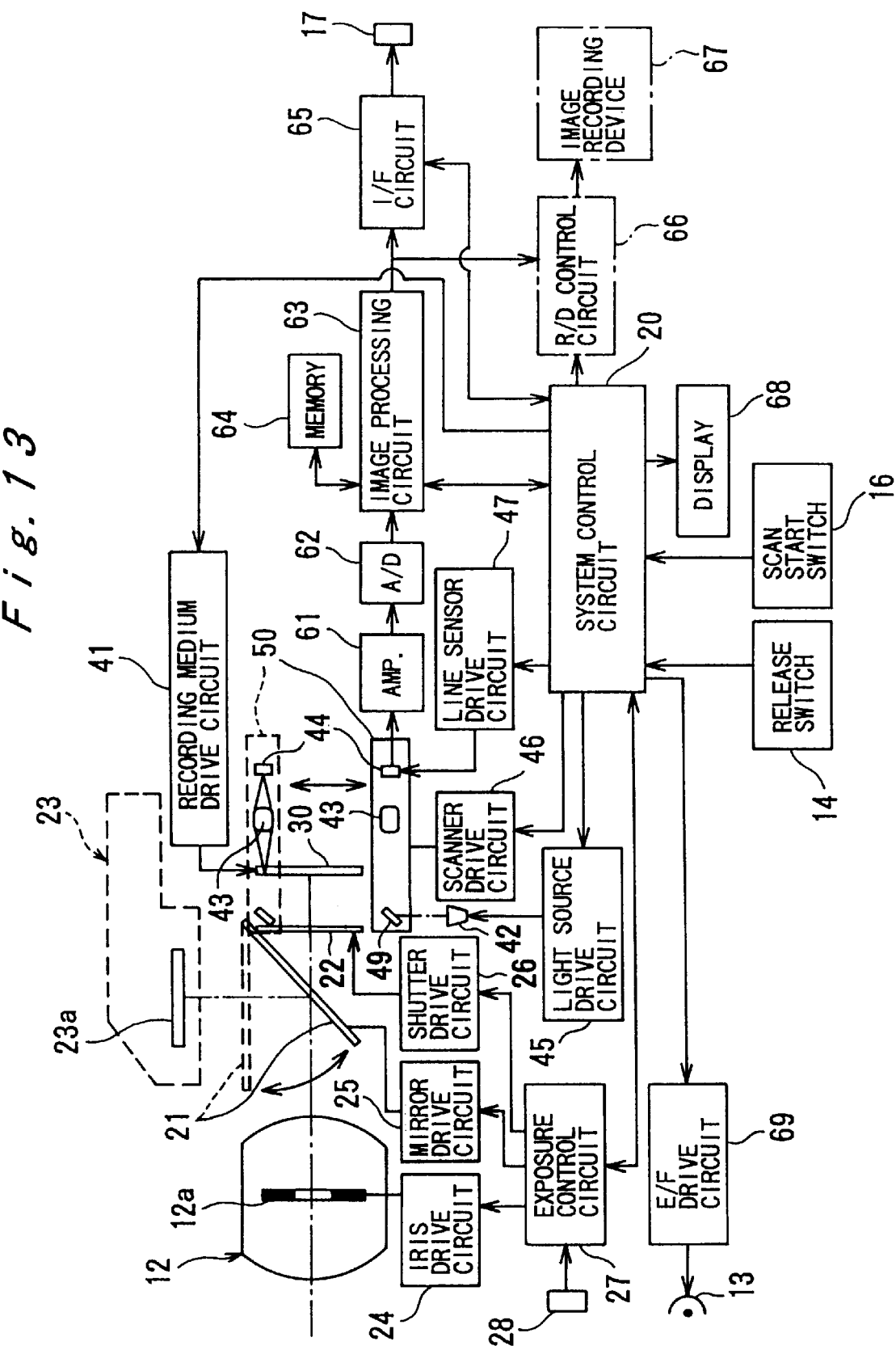
FIG. 13 is a block diagram of a still video camera having an image signal reading operation control device of a third embodiment.

FIG. 13 is a block diagram of a still video camera having an image signal reading operation control device of a third embodiment.

The scanning mechanism 50 has a total reflecting mirror 49, the scanner optical system 43 and the line sensor 44. The mirror 49 is provided on the moving member 52 (see FIG. 14) of scanning mechanism 50 in such a manner that the mirror 49 is moved between the shutter 22 and the electro-developing recording medium 30 when the moving member 52 is moved. The line sensor 44 is disposed opposed to the mirror 49 with respect to the electro-developing recording medium 30.

The light source 42 is provided outside the scanning mechanism 50 so that light emitted from the light source 42 enters the mirror 49. The emitted light is reflected by the mirror 49, and passes through the electro-developing recording medium 30, and is led to the line sensor 44 through the scanner optical system 43. Namely, an image developed by the electro-developing recording medium 30 is illuminated by the light source 42, and is formed on the light receiving surface of the line sensor by the scanner optical system 43.

Figure 14:
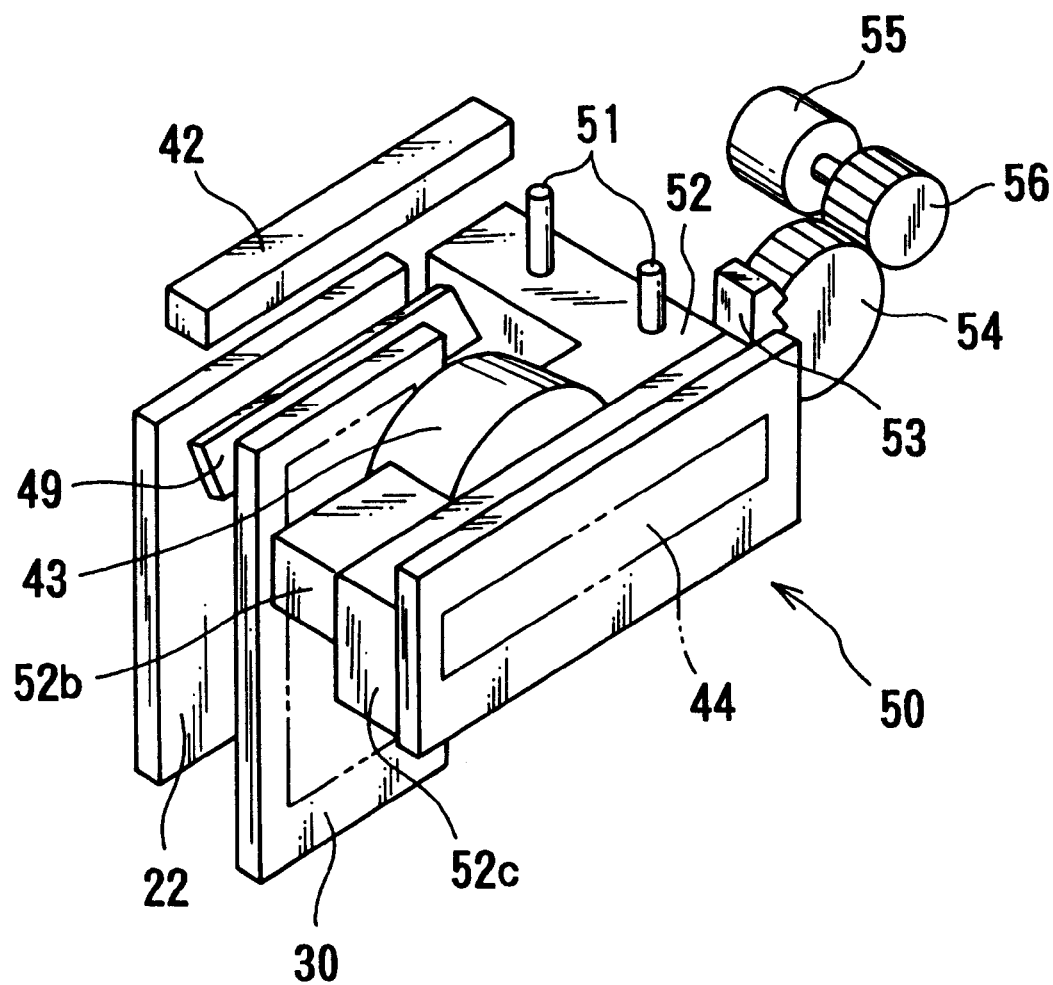
FIG. 14 is a perspective view showing a scanning mechanism and members provided around the mechanism, in the third embodiment.

Note that, although the light source 42 is positioned below the mirror 49 in FIG. 13, actually, the light source 42 is disposed above the mirror 49 as shown in FIG. 14.

The other constructions shown in FIG. 13 are the same as those shown in FIG. 2 corresponding to the first embodiment.

FIG. 14 shows the structure of the scanning mechanism 50 and members provided around the mechanism 50, in the third embodiment.

The moving member 52 is slidably supported by the guide shafts 51 and has a leg portion 52b. The shutter 22 is disposed in front of the electro-developing recording medium 30. The total reflecting mirror 49 fixed on the moving member 52 is projected between the shutter 22 and the electro-developing recording medium 30, and is extended in a, horizontal direction. The mirror 49 is inclined in such a manner that a surface facing the electro-developing recording medium 30 faces upwards, i.e., toward the light source 42. In other words, the mirror 49 is disposed in front of one surface of the electro-developing recording medium 30 so that light outputted by the light source 42 is led to the electro-developing recording medium 30.

The leg portion 52b is extended behind the electro-developing recording medium 30, and the scanner optical system 43 is attached to the leg portion 52b. The line sensor 44 is attached on the support portion 52c fixed on the rear surface of the leg portion 52b. The line sensor 44 and the mirror 49 are positioned at the same height position, and are extended in horizontal directions. The rack 53 fixed to the moving member 52 is meshed with the pinion 54 which is meshed with the gear 56 provided on the output shaft of the scan drive motor 55.

Figure 15:
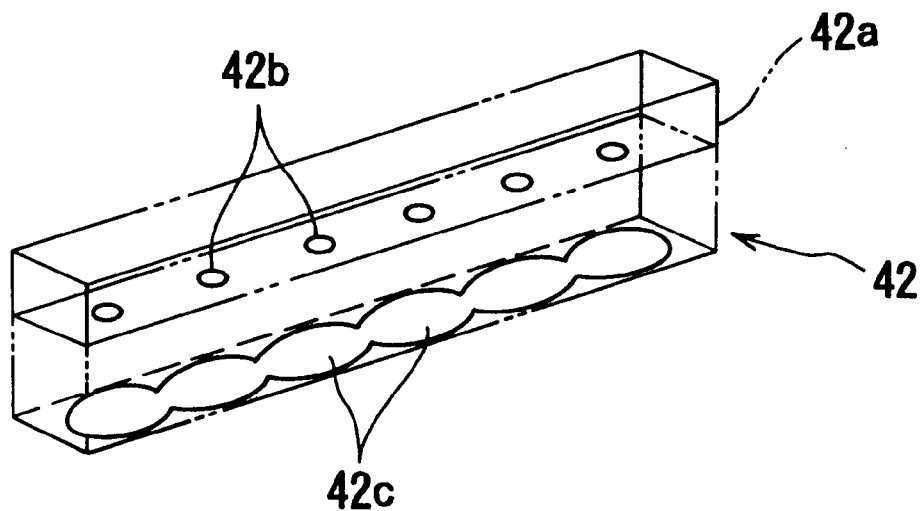
FIG. 15 is a perspective view showing an arrangement of LEDs and collimator lenses in the third embodiment.
Figure 16:
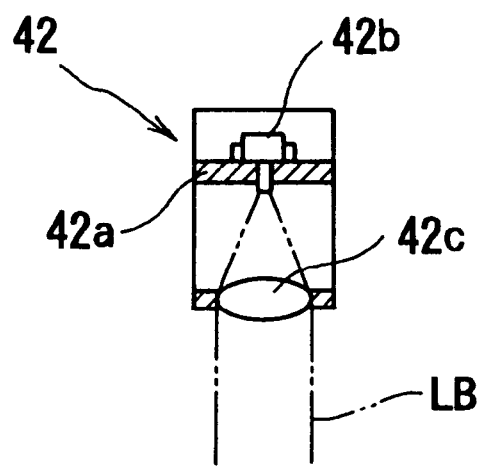
FIG. 16 is a view showing an operation of the collimator lens.

The light source 42 is disposed above the mirror 49, and is attached to a frame (not shown) in the camera. As shown in FIG. 15, the light source 42 has a support frame 42a, a plurality of LEDs 42b and a plurality of collimator lenses 42c. The collimator lenses 42c are provided in such a manner that no gap is formed between the collimator lenses 42c positioned adjacent each other, so that a light beam spot having no break is formed on the electro-developing recording medium 30. The LEDs 42b and the collimator lenses 42c are supported by the support frame 42a, and are arranged in horizontal directions, so that, as shown in FIG. 16, a light beam LB emitted from each of the LEDs 42b is converted into a parallel light beam by the collimator lens 42c, and enters the mirror 49. Note that a linear LED can be provided instead of the a plurality of the LEDs 42b.

When an image developed in the electro-developing recording medium 30 is read by the line sensor 44, the moving member 52 is moved upward by the scan drive motor 55 so that a scan of the line sensor 44 is carried out, and the line sensor 44 is moved in a direction perpendicular to the longitudinal direction of the line sensor 44. During this scanning operation, the emitted light of the light source 42 is reflected by the mirror 49, passes through the electro-developing recording mirror 30, and is led to the line sensor 44. Thus, the image formed on the electro-developing recording medium 30 is sensed by the line sensor 44.

Namely, a photographing operation and a reading operation of the third embodiment are the same as those of the first embodiment shown in FIG. 7.

As described above, the third embodiment is constructed in such a manner that the mirror 49 is disposed between the shutter 22 and the electro-developing recording medium 30, and the emitted light from the light source 42 is reflected by the total reflecting mirror 49 to enter the electro-developing recording medium 30. Thus, according to the third embodiment, since no bulky member such as the light source 42 and so on need be provided between the shutter 22 and the electro-developing recording medium 30, the distance between the shutter 22 and the photographing optical system 12 can be reduced, and the still video camera can be miniturized.

Figure 17:
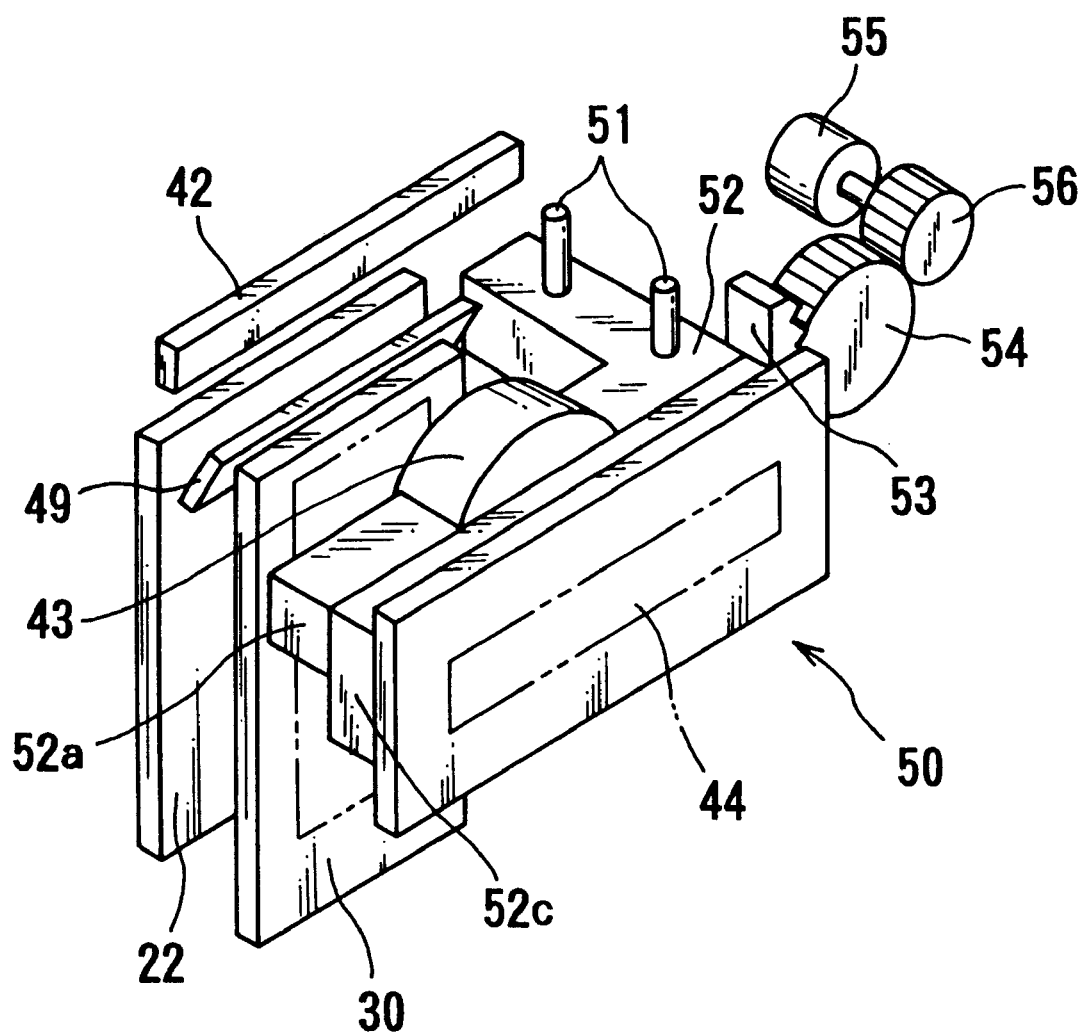
FIG. 17 is a view showing another example of the scanning mechanism in the third embodiment.

FIG. 17 shows another example of the scanning mechanism 50 in the third embodiment. In this example, the mirror 49 is a half-mirror and is inclined in such a manner that a surface facing the shutter 22 faces upwards, i.e., toward the light source 42. The other constructions are the same as those shown in FIG. 14.

According to this example of the scanning mechanism 50, one half of the light emitted by the light source 42 is directed toward the surface of the shutter 22. As discussed below, the surface of the shutter 22 is a specular reflective surface (such as metal) so that approximately a quarter of the light emitted by the light source 42 is passed by the half mirror 49 and led to the electro-developing recording medium 30. The remaining light does not enter the electro-developing recording medium 30.

In this other example of the scanning mechanism 50, the rear surface of the shutter 22, which surface faces the electro-developing recording medium 30, is a reflecting surface. Namely, the rear surface of the shutter 22 is subjected to a mirror finish so as to have specular reflection, or is coated so that light reflected by the shutter 22 enters the electro-developing recording medium 30. In this construction, the light led to the electro-developing recording medium 30 is reflected by the mirror 49 and the reflecting surface of the shutter 22 prior to being led to the electro-developing recording medium 30.

In the third embodiment, although the light source 42 is fixed to the frame provided in the camera, and cannot be moved by the moving member 52, the light source 42 may be connected to the moving member 52 to be displaced with the mirror 49 and the line sensor 44.

A fourth embodiment of the present invention is described below. Note that an external view of a still video camera having an image signal generating device of the fourth embodiment is the same as that of the first embodiment.

In the fourth embodiment, the electro-developing recording medium 30 has at least three recording areas, on each of which a primary color (red(R), green (G) or blue (B)) image is formed through a dichroinc prism. Namely, a block diagram of the fourth embodiment is basically the same as that of the first embodiment except for the construction by which the three primary color images are formed on the electro-developing recording medium.

Figure 18:
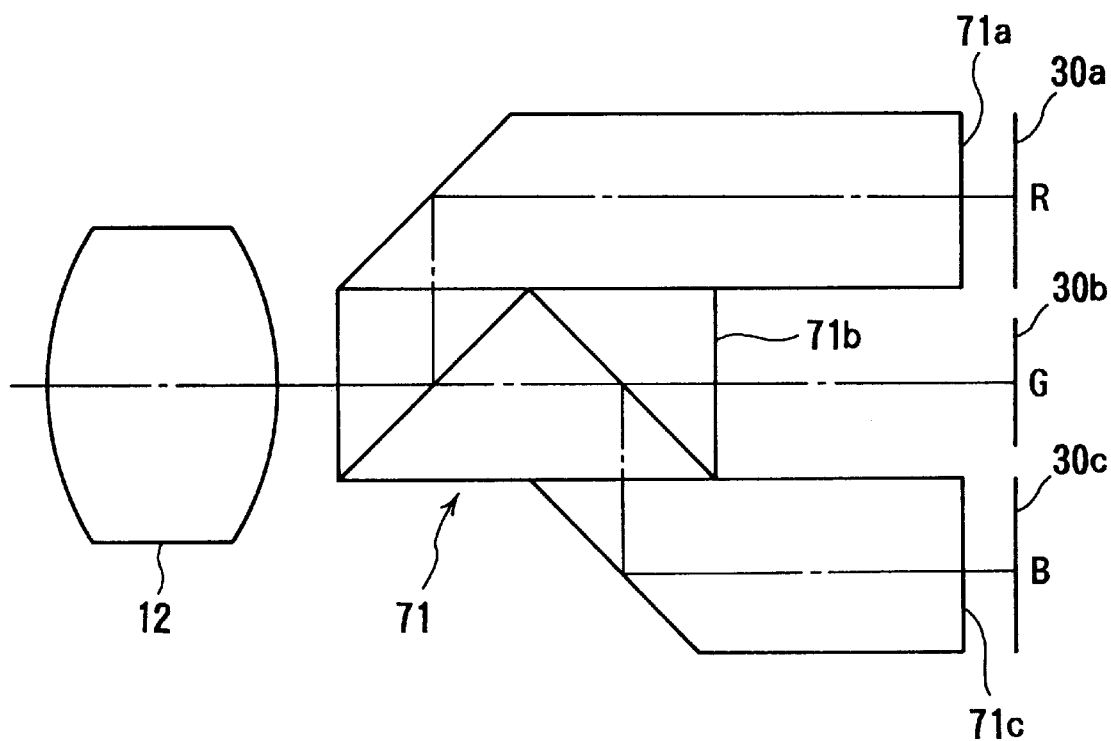
FIG. 18 is a plane view showing a dichroic prism.

FIG. 18 shows a dichroic prism 71 that may be disposed behind the photographing optical system 12. A light beam passing through the photographing optical system 12 is color-separated into R, G and B components by the dichroic prism 71 and is outputted from three emergent planes 71a, 71b and 71c. Three recording areas 30a, 30b and 30c of the electro-developing recording medium 30 are disposed in such a manner that the recording areas 30a, 30b and 30c face the emergent planes 71a, 71b and 71c, respectively.

In order for obtaining the focused image at the recording areas 30a, 30b and 30c, respectively, the dichroic prism is designed so that each of the separated light paths optically passes the same distance from the lens 12 to the recording areas.

For sensing the R, G and B images formed on the electro-developing recording medium 30, the number of light sources, scanner optical systems, line sensors, line sensor drive circuits, amplifiers and A/D converters provided in the fourth embodiment is three, respectively.

Figure 19:
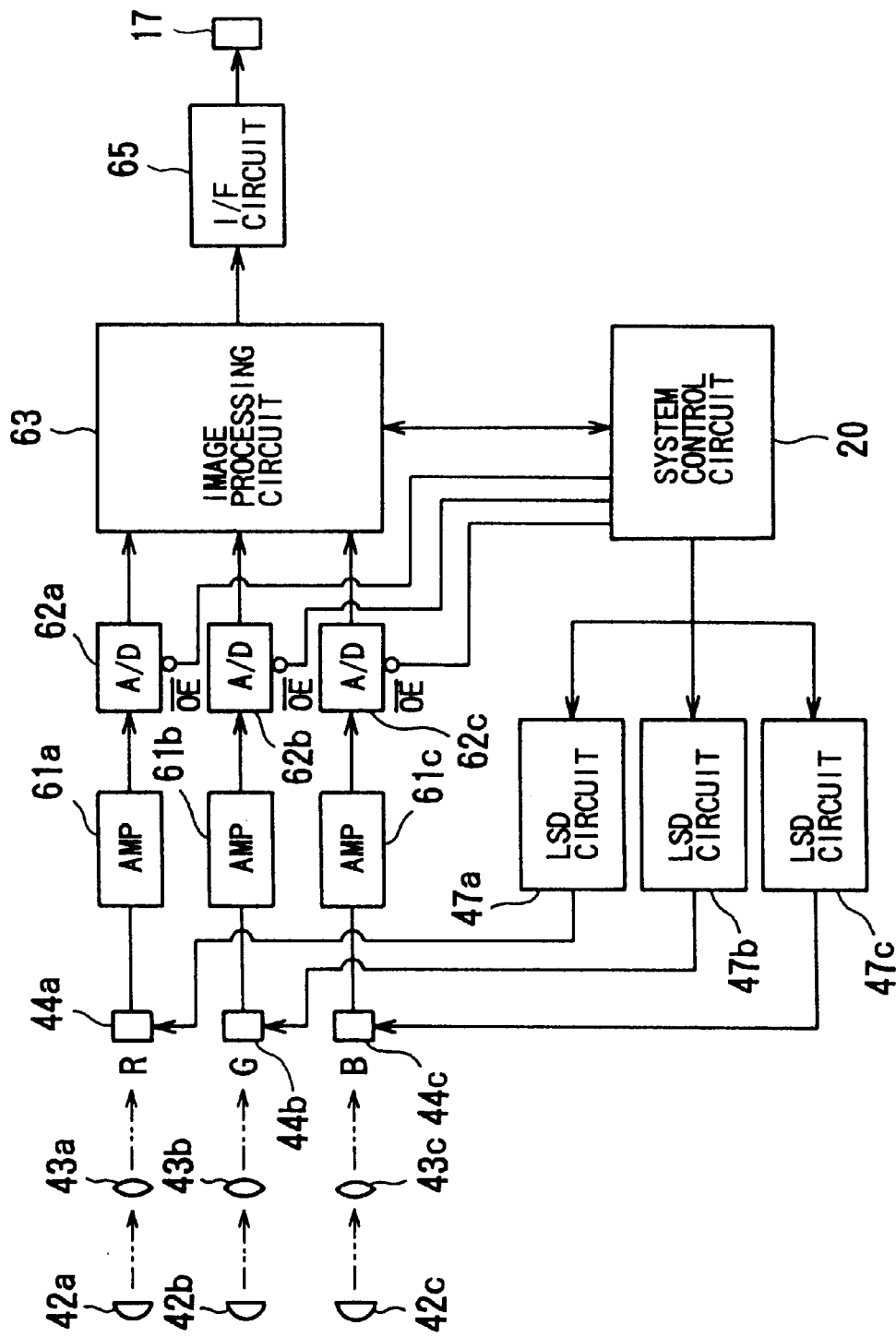
FIG. 19 is a block diagram of a circuit for sensing red, green and blue images in a fourth embodiment.

Namely, as shown in FIG. 19, a first line sensor 44a sensing the R image, a second line sensor 44b sensing the G image and a third line sensor 44c sensing the B image are provided, and scanner optical systems 43a, 43b and 43c are disposed in front of these line sensors 44a, 44b and 44c, respectively. Light sources 42a, 42b and 42c are disposed in front of the scanner optical systems 43a, 43b and 43c, respectively. The line sensors 44a, 44b and 44c are driven by a first line sensor drive circuit 47a, a second line sensor drive circuit 47a and a third line sensor drive circuit 47c, respectively. These line sensors 44a, 44b and 44c are connected to the amplifiers 61a, 61b and 61c, respectively, output signals of which are inputted into the image processing circuit 63 through the A/D converters 62a, 62b and 62c, respectively.

Figure 20:
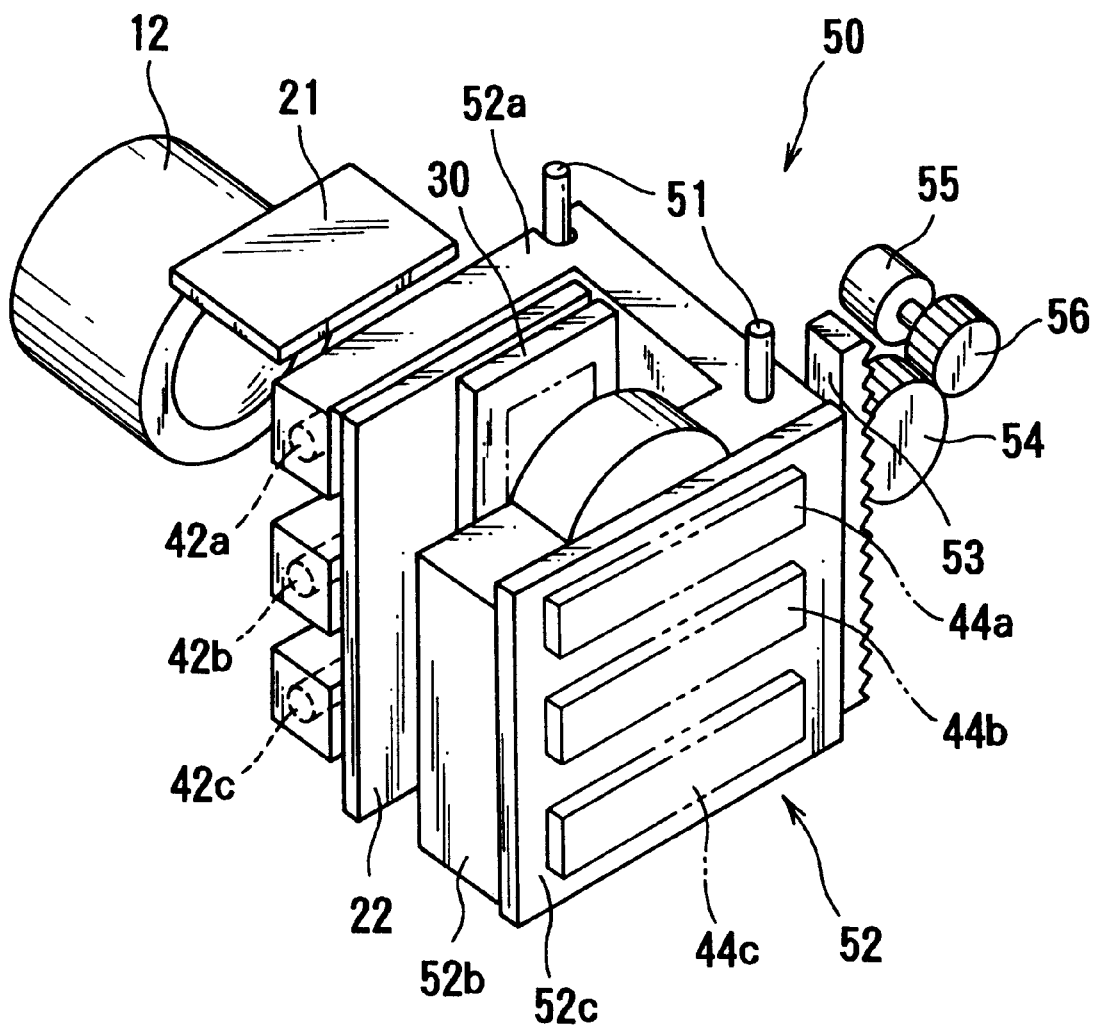
FIG. 20 is a perspective view showing a scanning mechanism and members provided around the mechanism, in the fourth embodiment.

FIG. 20 shows the structure of the scanning mechanism 50 and members provided around the mechanism 50 in the fourth embodiment.

The moving member 52 is slidably supported by the guide shafts 51 and has the first and second leg portions 52a and 52b. The number of first leg portions 52a is three, and these first leg members 52a are extended between the quick return mirror 21 and the shutter 22. The second leg portion 52b is extended behind the electro-developing recording medium 30. The support member 52c is provided behind the second leg portion 52b.

The light sources 42a, 42b and 42c are supported by the three first leg portions 52a, and the scanner optical systems 43a, 43b and 43c are attached to the second leg portion 52b. The first line sensor 44a, the second line sensor 44b and the third line sensor 44c are connected to the support member 52c, and are positioned behind the light sources 42a, 42b and 42c. The light sources 42a, 42b and 42c and the line sensors 44a, 44b and 44c are extended in horizontal directions.

The rack 53 fixed to the moving member 52 is meshed with a pinion 54 which is meshed with a gear 56 provided on an output shaft of a scan drive motor 55.

Figure 21:
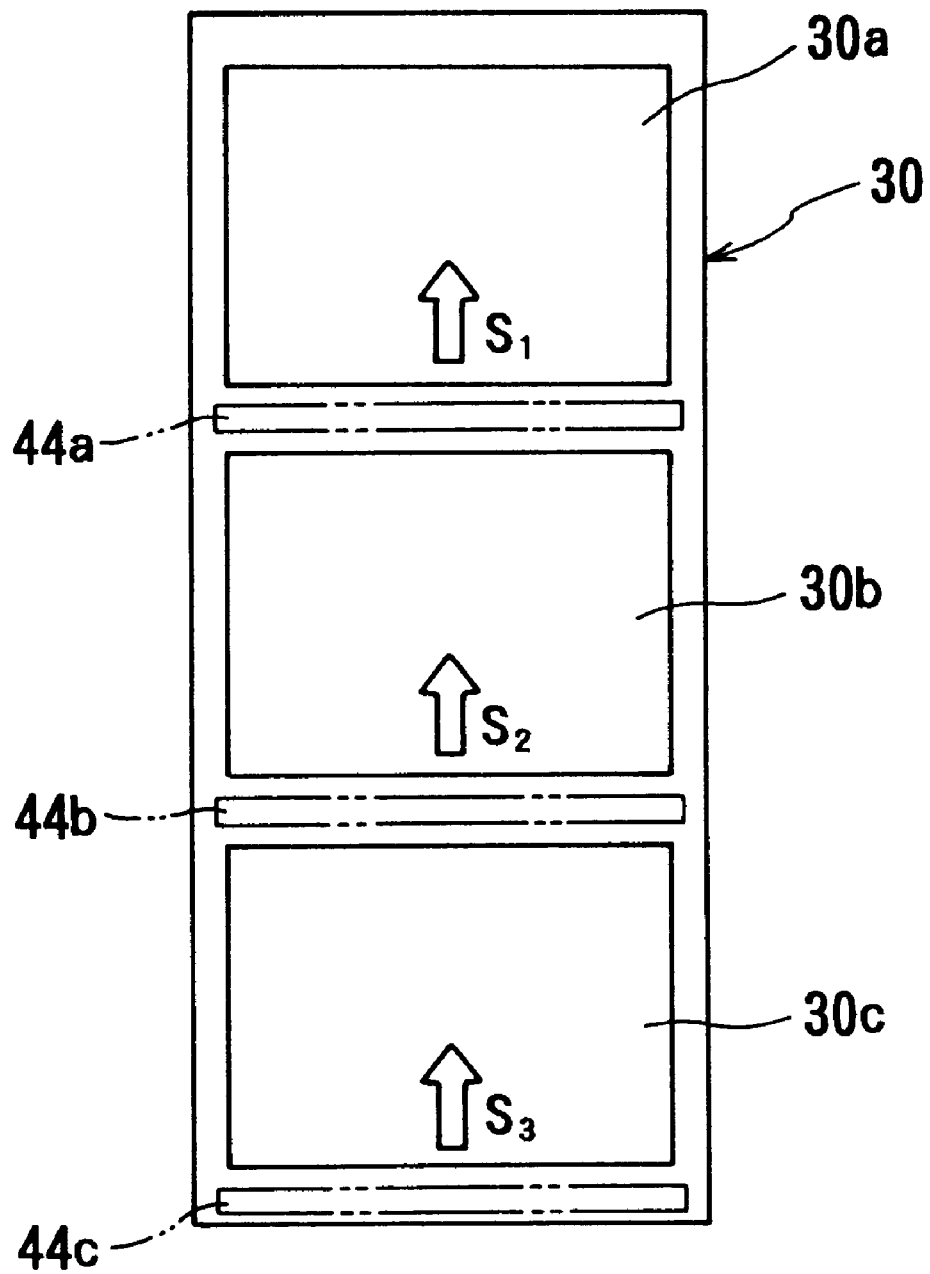
FIG. 21 is a view showing a positional relationship between the line sensors and three recording areas of an electro-developing recording medium.

FIG. 21 shows the positional relationship between the line sensors 44a, 44b and 44c and the three recording areas 30a, 30b and 30c of the electro-developing recording medium 30.

The electro-developing recording medium 30 has first recording area 30a on which an R image is formed, second recording area 30b on which a G image is formed, and third recording area 30c on which a B image is formed. In an operation other than a photographing operation in which an image is formed on the electro-developing recording medium 30, the moving member 52 is positioned at a relatively low position, so that each of the line sensors 44a, 44b and 44c is positioned below each of the recording areas 30a, 30b and 30c. When a photographing operation has been completed and images have been developed in the electro developing recording medium 30, the scan drive motor 55 is operated, so that the moving member 52 is moved upward. Namely, each of the line sensors 30a, 30b and 30c is moved upward along each of the recording areas 30a, 30b and 30c (see arrows S1, S2 and S3), so that the images formed on the recording areas 30a, 30b and 30c are sensed.

Figure 22:
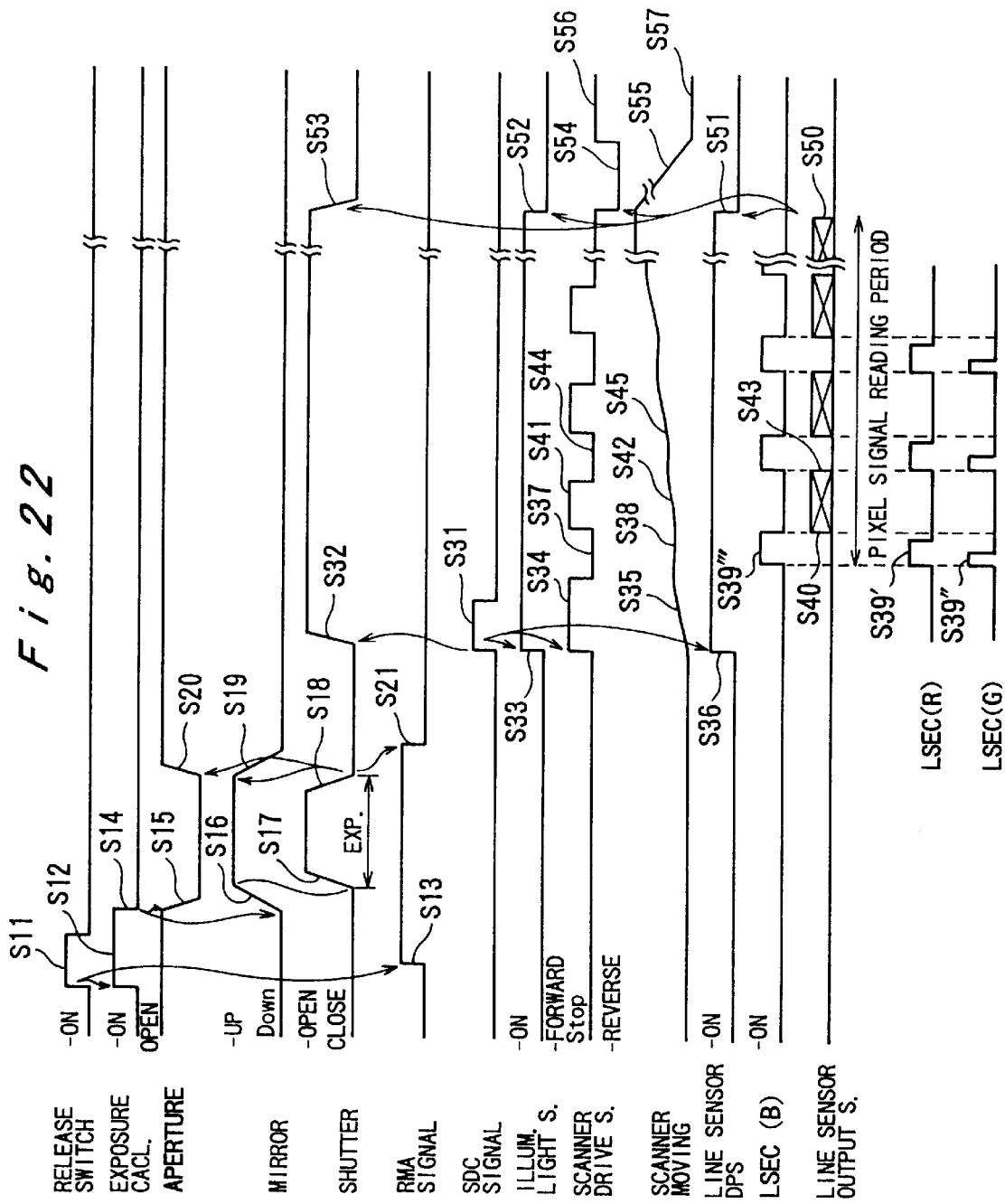
FIG. 22 is a timing chart showing a photographing operation and a reading operation of the pixel signals from the line sensor, in the fourth embodiment.

FIG. 22 is a timing chart showing a photographing operation and a reading operation of the pixel signals from the line sensor 44.

The photographing operation shown by references S11 through S21 is the same as that of the first embodiment shown in FIG. 7.

When it is confirmed that a scanner drive signal has been outputted (reference S31), the shutter 22 is opened (reference S32), and the light source 42 is lit (reference S33). Then, a scanner drive signal is outputted (reference S34), so that the scan drive motor 55 operates in a forward direction, and the moving member 52 of the scanning mechanism 50 starts to move upward. Approximately at the same time as the start of movement of the scanning mechanism 50, the line sensor drive power source included in the line sensor drive circuit 47 is turned ON (reference S36).

When it is confirmed that the line sensors 44a, 44b and 44c are set to reading start positions, the output of the scanner drive signal is stopped (reference S37), and thus the scan drive motor 55 is stopped (reference S38).

Then, exposures of the line sensors 44a, 44b and 44c are started, and thus electric charge accumulation in the line sensors 44a, 44b and 44c is performed (reference S39', S39", S39'", respectively). The electric charge accumulation periods of the line sensors 44a, 44b and 44c are controlled by the line sensor drive circuits 47a, 47b and 47c, independently for each of the line sensors 47a, 47b and 47c. In FIG. 22, the electric charge accumulation period of the third line sensor 44c is the longest, and the electric charge accumulation period of the second line sensor 44b is the shortest. The reason why the electric charge accumulation periods are controlled independently for the line sensors 47a, 47b and 47c is to remove effects of wave length distributions of the light source 42a, 42b and 42c, utilization ratios of light of the dichroic prism 71, and the difference in spectral luminance efficiency for each of the line sensors 44a, 44b and 44c to red, green and blue, so that clear color image is obtained.

When the longest electric charge accumulation period in the three line sensors 44a, 44b and 44c has passed, namely, when it is confirmed that the exposures of the line sensors 44a, 44b and 44c have been completed, reading scans of the line sensors 44a, 44b and 44c and output operations of pixel signals of one horizontal scanning line from the line sensor 44 are started (reference S40). Then, the scanner drive signal for operating the scan drive motor 55 in a forward direction is outputted (reference S41), so that the moving member 52 starts to move upward (reference S42).

During movement of the moving member 52, when it is confirmed that the reading scans of the line sensors 44a, 44b and 44c are completed, the reading scan is stopped (reference S43). Note that the completion of the reading scan is controlled by counting pulse signals, for example, which are outputted from the line sensor drive circuits 47a, 47b and 47c to drive the line sensor 44a, 44b and 44c.

When it is confirmed that the line sensors 44a, 44b and 44c have been set at the positions of the next horizontal scanning lines, the output of the scanner drive signal is stopped (reference S44), and thus the scan drive motor 55 is stopped (reference S45).

Thus, in this embodiment, the line sensors 44a, 44b and 44c are repeatedly moved and then stopped after a predetermined time and by a predetermined amount, by the scanning mechanism 50, so that the line sensors 44a, 44b and 44c move on the imaging planes of the scanner optical systems 43a, 43b and 43c to scan the images, and thus the color images developed in the electro-developing recording medium 30 are read through the line sensors 44a, 44b and 44c.

When all of the horizontal scanning lines have been read out (reference S50), the drive power source of the line sensor 44 is turned OFF (reference S51), and the light source 42 is turned OFF (reference S52). Then, the shutter 22 is closed (reference S53), and a scanner drive signal for operating the scan drive motor 55 in the rearward direction is outputted (reference S54), and thus the moving member 52 starts to descend (reference S55).

During the descending movement of the moving member 52, when it is confirmed that the line sensors 44a, 44b and 44c have returned to the initial positions thereof, the output of the scanner drive signal is stopped (reference S56), so that the scan drive motor 55 is stopped (reference S57).

Figure 23:
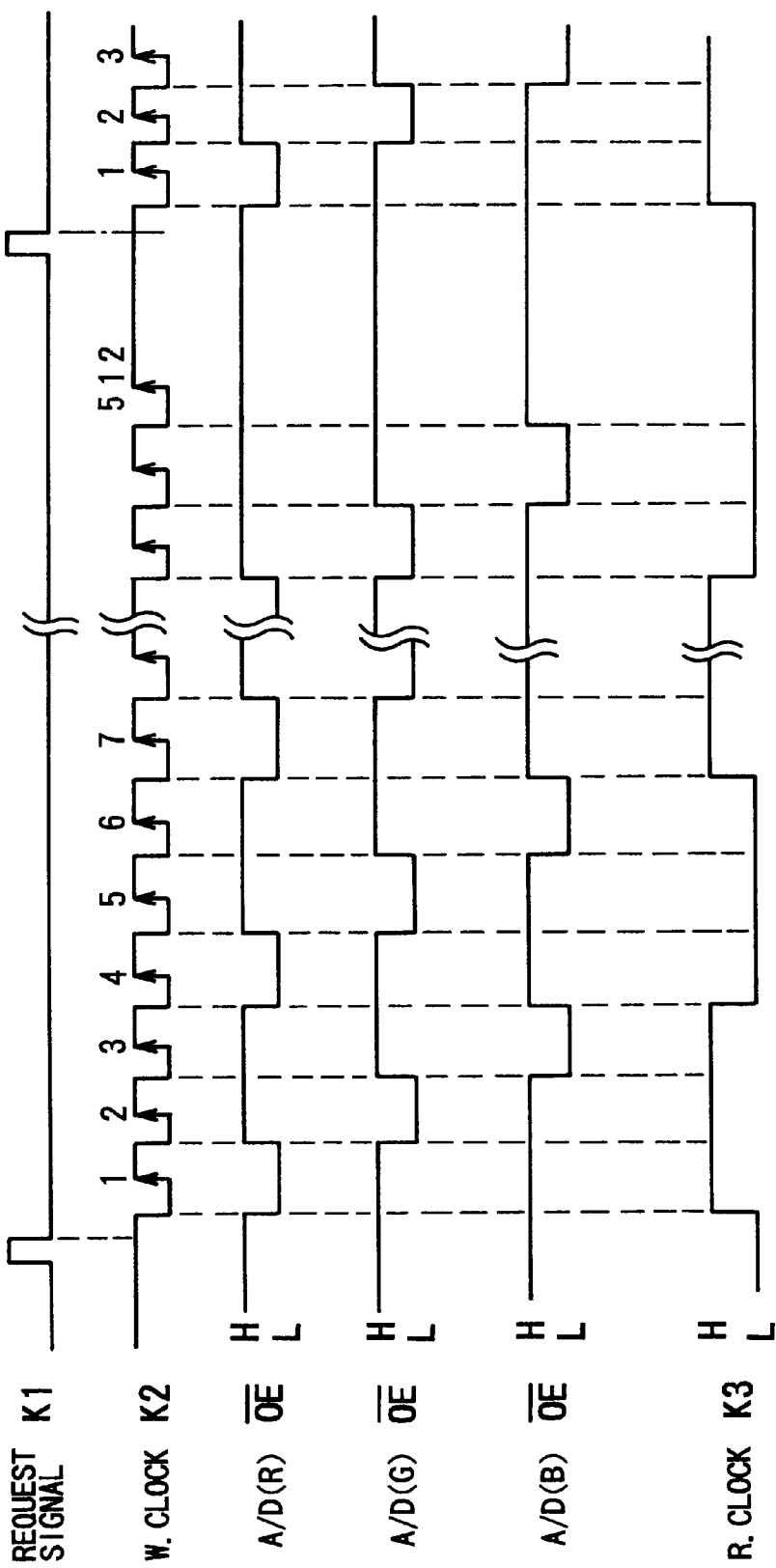
FIG. 23 is a timing chart showing a reading operation in which pixel signals are read out from the line sensors, and a storing operation in which image data is stored in an image data recording medium such as a hard disk.

FIG. 23 is a timing chart showing a reading operation in which pixel signals of each primary color are read out from the line sensors 44a, 44b and 44c, and a storing operation in which image data is stored in an image data recording medium such as a hard disk by the image recording device.

The system control circuit 20 always checks whether a storing data request signal K1 has been outputted from the image recording device. When the request signal has been outputted, output terminals of the A/D converters 62a, 62b and 62c are set to enable states at predetermined timings under control of the system control circuit 20.

Namely, the OE signal of the A/D converter 62a for the R image is made "low(L)", so that one pixel signal is read out from the line sensor 44a. This pixel signal is stored in the image data recording medium through the image recording device in synchronization with a raise of a writing clock K2. Then, the OE signal of the A/D converter 62b for the G image is made L, so that one pixel signal is read out from the line sensor 44b, and is stored in the image data recording medium. Similarly, the OE signal of the A/D converter 62c for the B image is made L, so that one pixel signal is read out from the line sensor 44c, and is stored in the image data recording medium. Namely, the reading operations of pixel signals from the line sensors 44a, 44b and 44c, and the storing operation of the image data recording medium are performed substantially at the same time.

A line sensor reading clock K3 is changed between "high(H)" and L at a predetermined timing. While this clock K3 is H or L, pixel signals sequentialy read from the line sensors 44a, 44b and 44c correspond to the same pixel of the image.

Thus, a one byte pixel signal is stored in the image data recording medium at every rise of the writing clock K2, and this writing operation in the image recording device is stopped when a storing operation of 512 byte's worth of pixel signals has been completed. Then, when the storing data request signal K1 is again outputted, the operation described above is performed again. Namely, the reading operations of the line sensors 44a, 44b and 44c, and the storing operations of the image recording device are performed substantially at the same time.

As described above, in the fourth embodiment, a plurality of line sensors 44a, 44b and 44c are provided in accordance with a plurality of color signals obtained by color-separation, and these line sensors 44a, 44b and 44c are scanned at the same time so that each of the color images is simultaneously sensed. Namley, the pixel signals corresponding to the color images are read out from the line sensors 44a, 44b and 44c substantially at the same time and transferred directly to an external memory device. Therefore, a large storage memory in the camera does not need to be provided to store a plurality of color image signals. Further, in comparison with a construction in which one line sensor is used for the color scanning operation, the time for the scanning operation is shortened in the fourth embodiment.

Note that the pixel signals can be transferred to an external device through the interface circuit (reference 65 in FIG. 2 in the first embodiment) substantially at the same time as the pixel signals are read out from the line sensors 44a, 44b and 44c.

Figure 24:
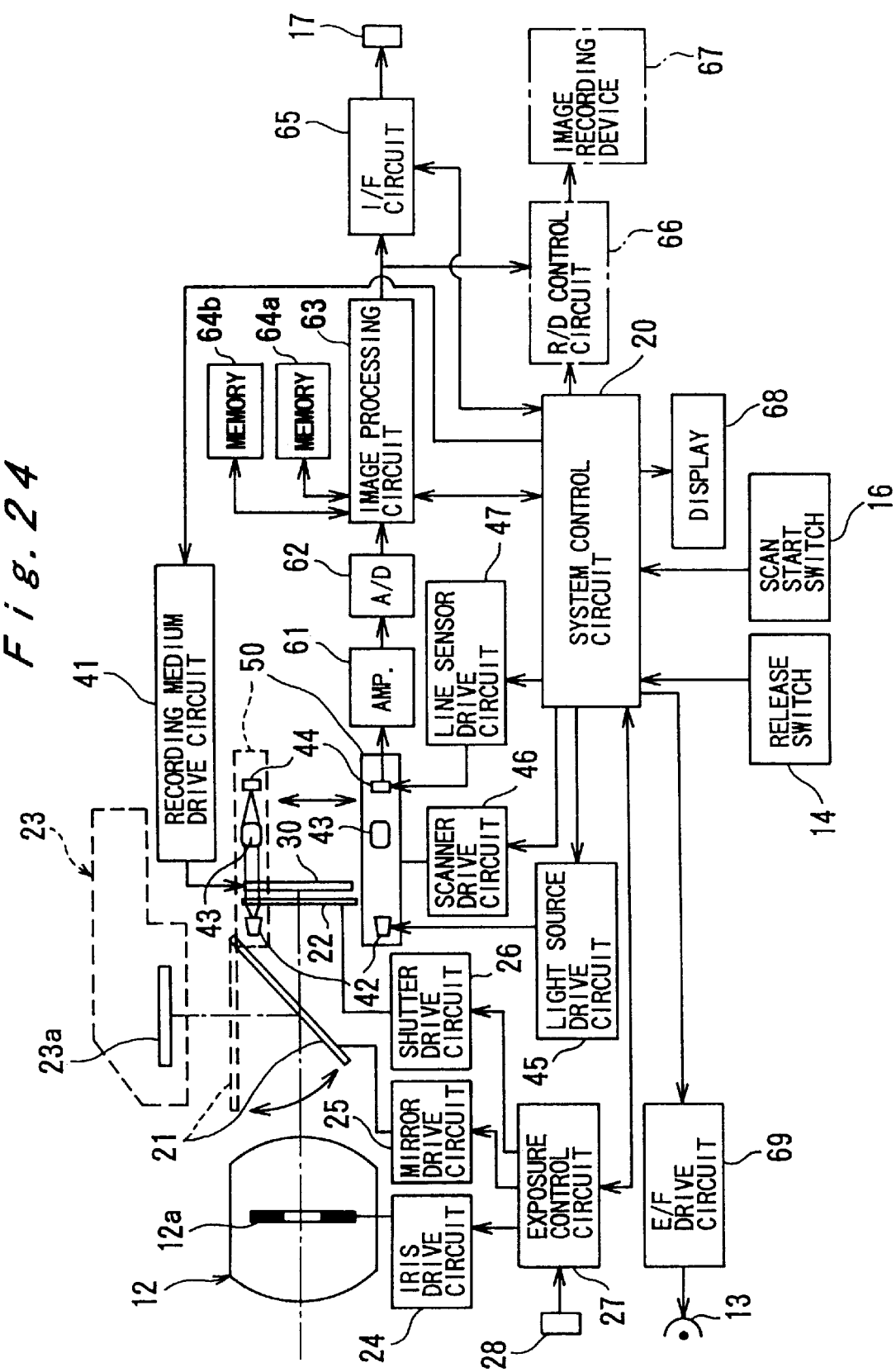
FIG. 24 is a block diagram of the still video camera to which a fifth embodiment of the present invention is applied.

A fifth embodiment of the present invention is described below. An external view of a still video camera having an image signal generating device of the fifth embodiment is the same as that of the first embodiment. Further, a block diagram of the fifth embodiment is basically the same as that of the first embodiment except that first and second memories 64a and 64b are connected to the image processing circuit 63, as shown in FIG. 24. In the fifth embodiment, similarly to the fourth embodiment, the dichroic prism is provided, and the electro-developing recording medium has three recording areas to record the three primary color images. On the other hand, a single line sensor 44 is provided for sensing the three primary color images, which is different from the fourth embodiment.

A timing chart showing a photographing operation and a reading operation of the pixel signals from the line sensor is basically the same as that of the first embodiment shown in FIG. 7. Therefore, with reference to FIG. 7, the reading operation of the fifth embodiment is described below.

The reading operation as far as the process shown by reference S36 in the fifth embodiment is the same as that of the first and fourth embodiments.

When it is confirmed that the line sensor 44 is set to the reading start position, the output of the scanner drive signal is stopped (reference S37), and thus the scan drive motor 55 is stopped (reference S38). By this operation, the line sensor 44 is stopped at a position corresponding to the lower end portion of the recording area 30c of the electro-developing recording medium 30, on which a B image is recorded, for example.

Then, exposure of the line sensor 44 is started, and thus electric charge accumulation in the line sensor 44 is performed (reference S39), and a reading scan of the line sensor 44 and an output operation of pixel signals of one horizontal scanning line from the line sensor 44 are started (reference S40), similarly to the fourth embodiment. Namely, pixel signals corresponding to a color image are generated in the line sensor 44. Then, the scanner drive signal is outputted (reference S41), so that the moving member 52 starts to move upward (reference S42). During this movement, the pixel signals are stored in the first memory 64a.

During movement of the moving member 52, when it is confirmed that the reading scan of one horizontal scanning line has been read out and stored in the first memory 64a, the reading scan is stopped (reference S43). Then, when it is confirmed that the line sensor 44 has been set at the position of the next horizontal scanning line, the output of the scanner drive signal is stopped (reference S44), and thus the scan drive motor 55 is stopped (reference S45).

When one frame's worth of B image signal has been read from the electro-developing recording medium (reference S46), the line sensor 44 is set to a position corresponding to the lower end portion of the recording area 30b on which a G image is recorded. Then, the operation described above is performed, and one frame's worth of G image signal is read out from the electro-developing recording medium and stored in the second memory 64b.

Then, the line sensor 44 is set to a position corresponding to the lower end portion of the recording area 30c on which an R image is recorded, so that a reading operation for the R image signal is started. The R image signal is stored in neither the first memory 64a nor the second memory 64b, but is outputted to the image recording device 67 and recorded in an image data recording medium such as a hard disk, an operation which is different from those for the B and G image signals. At this time, the B and G image signals are also recorded in the image data recording medium.

As described above, although the B and G image signals are stored in the memories 64a and 64b, and then, recorded in the hard disk, the R image signal is directly recorded in the hard disk without being stored in the memories 64a and 64b. Therefore, in comparison with a construction in which all three color images of R, G and B are stored in the memories, according to the fifth embodiment, the capacity of memories 64a and 64b can be drastically reduced.

Figure 25:
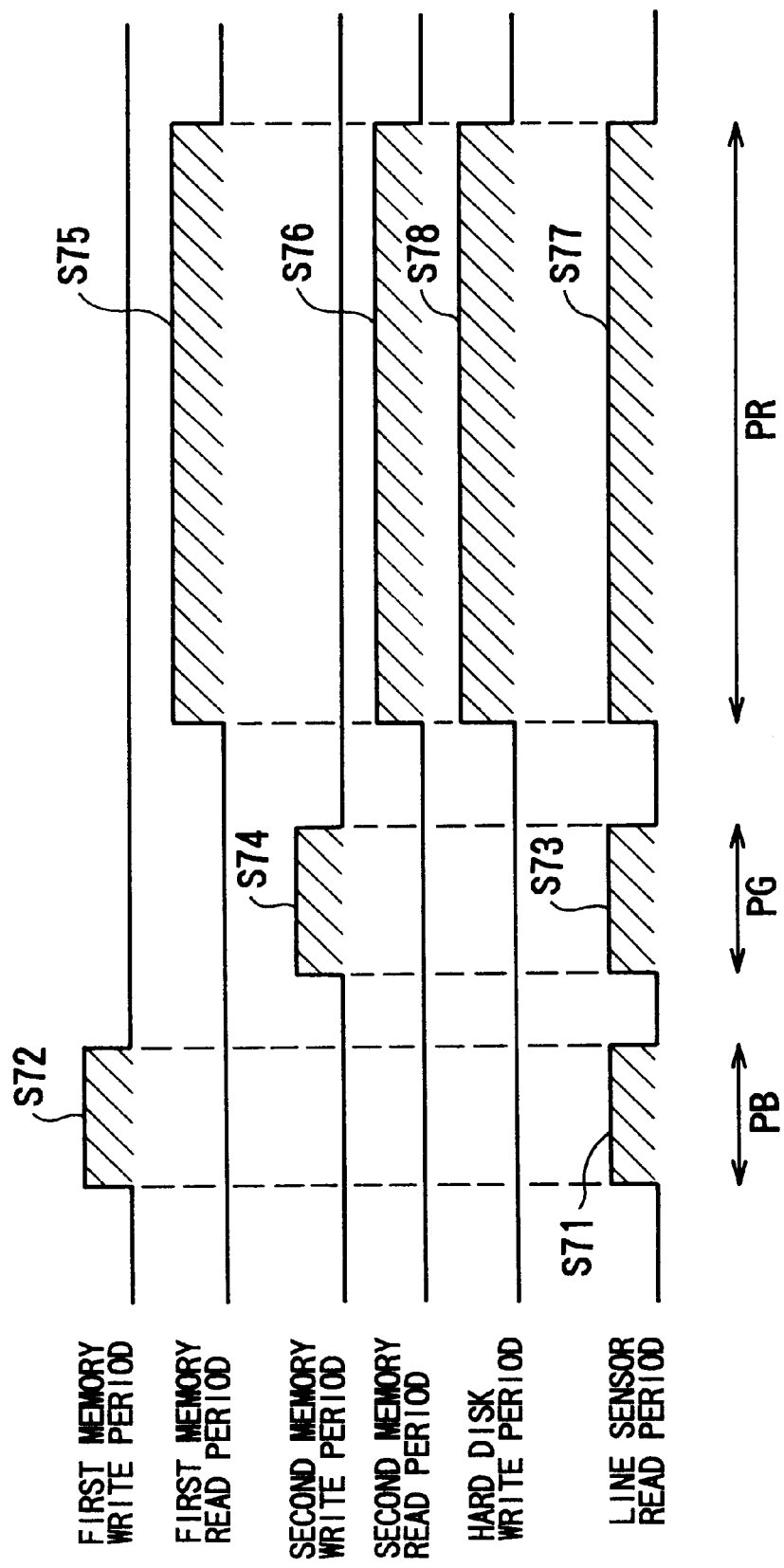
FIG. 25 is a timing chart showing a recording operation in which the R, G and B image signals are recorded in an image data recording medium.

FIG. 25 shows a recording operation in which the R, G and B image signals are recorded in the image data recording medium. Each of periods PB, PG and PR corresponds to the pixel signal reading period shown in FIG. 7. Namely, each of these periods corresponds to a period in which image signals of one frame are read out. In this period PB, the B pixel signals are read out through the line sensor 44 (reference S71), and are written in the first memory 64a (reference 572). In a period PG, the G pixel signals are read out through the line sensor 44 (reference S73), and are written in the second memory 64b (reference S74). In a period PR, different from the periods PB and PG, the B and G pixel signals are read out from the first and second memories 64a and 64b (references S75 and S76), and the R pixel signals are read out through the line sensor 44 (reference S77). And at the same time, these signals are written in the image data recording medium such as a hard disk (reference S78).

Figure 26:
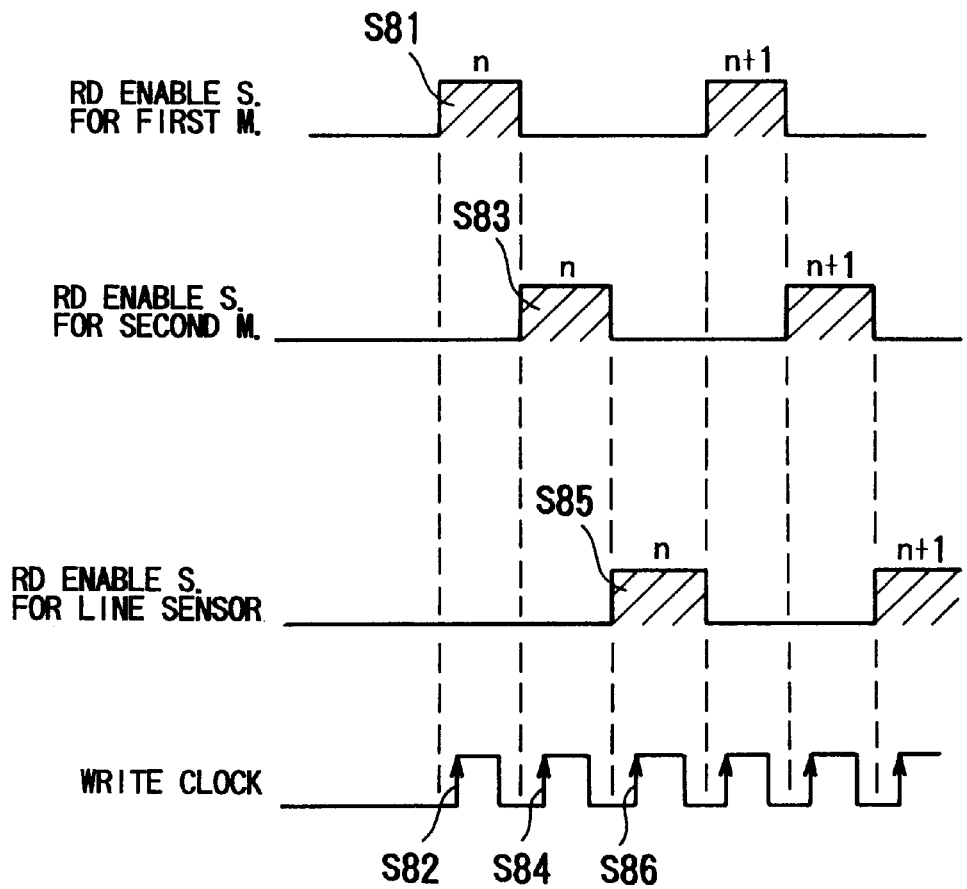
FIG. 26 is a timing chart showing a control signal outputted from a system control circuit in a period PR shown in FIG. 25.

FIG. 26 is a timing chart showing a control signal outputted from the system control circuit 20 in the period PR shown in FIG. 25.

While a reading data enable signal for the first memory 64a is outputted (reference S81), a write clock for the hard disk is outputted (reference S82), so that a pixel signal (n) of B is written in the hard disk. After an output of a reading data enable signal for the first memory 64a is stopped, a reading data enable signal for the second memory 64b is outputted (reference S83). During this operation, a write clock for the hard disk is outputted (reference S84), so that a pixel signal (n) of G is written in the hard disk. After the output of the enable signal for the second memory 64a is stopped, a reading data enable signal for the line sensor 44 is outputted (reference S85). During this operation, a write clock for the hard disk is outputted (reference S86), so that a pixel signal (n) of R is written in the hard disk.

Thus, after (n)th R. G and B pixel signals are written in the hard disk, (n+1)th R, G and B pixel signals are written in the hard disk by a similar operation.

As described above, in the fifth embodiment, while the pixel signals of B and G are read out from the memories 64a and 64b and written in the hard disk, the pixel signal of R sensed by the line sensor 44 is writted in the hard disk. Namely, the pixel signals are recorded in the hard disk in a dot-sequential system in which the B pixel signal, the G pixel signal and the R pixel signal are stored in the image data recording medium, alternately. Instead of this system, a line-sequential system, in which one line of the B pixel signals, one line of the G pixel signals and one line of the R pixel signals are stored in the image data recording medium, alternately, can be applied. In the line-sequential system, the enable period, in which the pixel signals are read from the line sensor 44 or stored in the memories 64a and 64b, corresponds to a period for reading pixel signals of one horizontal scanning line.

Figure 27:
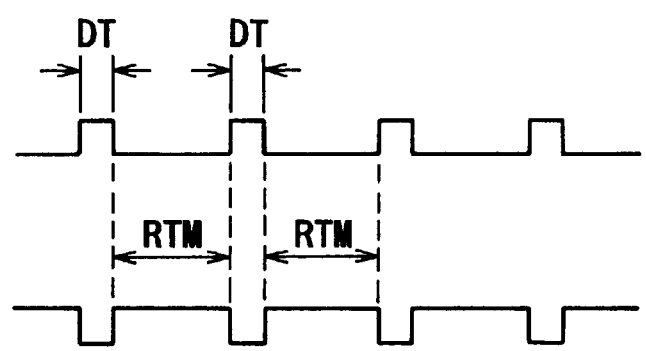
FIG. 27 is a diagram showing a relationship between an electric charge accumulation period DT in a line sensor, and the reading period RTM for which the pixel signals are read from the line sensor and written in a memory.

FIG. 27 shows a relationship between an electric charge accumulation period DT in the line sensor 44, and the reading period RTM for which the pixel signals are read from the line sensor 44. While the reading period RTM is determined in accordance with the performance of the line sensor 44, and has a constant value, the electric charge accumulation period DT has a different value for each color of R, G and B. The electric charge accumulation periods DT for R, G and B are controlled and independently set for R, G and B. The reason why the electric charge accumulation periods are controlled independently for R, G and B is to remove the effects of utilization ratios of light in the dichroic prism, and the difference in spectral luminance efficiency of the line sensor 44 to R, G and B, so that an clear color image is obtained.

As described above, in the fifth embodiment, the color image (R pixel signals, in this embodiment) which has the longest electric charge accumulation period OT for the line sensor 44 from among R, G and B, is read out from the electro-developing recording medium last. This is because the time required for writing the R pixel signal in the hard disk is much longer than that required for writing the G and B pixel signals in the memories 64a and 64b. Namely, the period of a writing operation for the hard disk is approximately ten times a period of the writing operation for the memories 64a and 64b.

Figure 28:
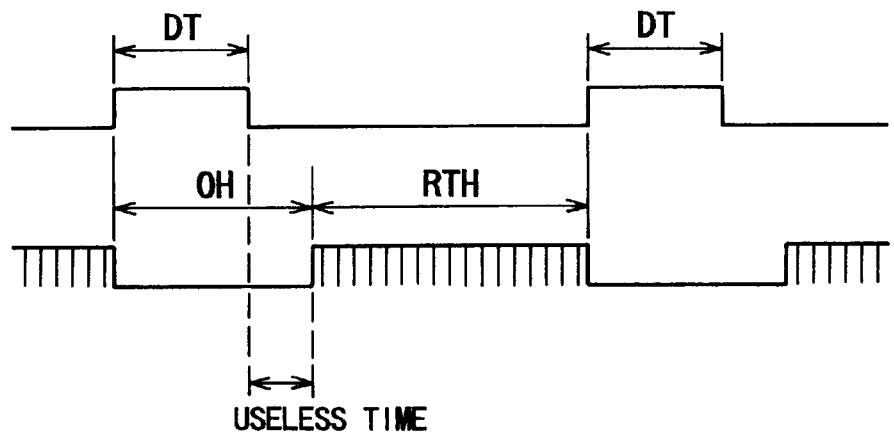
FIG. 28 is a diagram showing a relationship between an electric charge accumulation period DT in a line sensor, and the reading period RTH for which the pixel signals are read from the line sensor and written in a hard disk.

In a hard disk device, when a writing head has finished to write one horizontal scanning line data on a hard disk, as shown in FIG. 28, a predetermined length of overhead time OH needs until the writing head is set in a stated in which the writing head can write next one horizontal scanning line data on the hard disk. Since this overhead time is longer than the electric charge accumulation period DT, the difference between the overhead time and the electric charge accumulation period DT is useless. Therefore, in the fifth embodiment, the overhead time is overlapped with the longest electric charge accumulation period DT (i.e., for the R signal signal), and thus, the useless time is reduced as short as possible, whereby the time for recording all the color image signals into the hard disk can be shortened. Note that, in FIG. 28, reference RTH means a time for writing R pixel signals on the hard disk.

A sixth embodiment of the present invention is described below.

Figure 29:
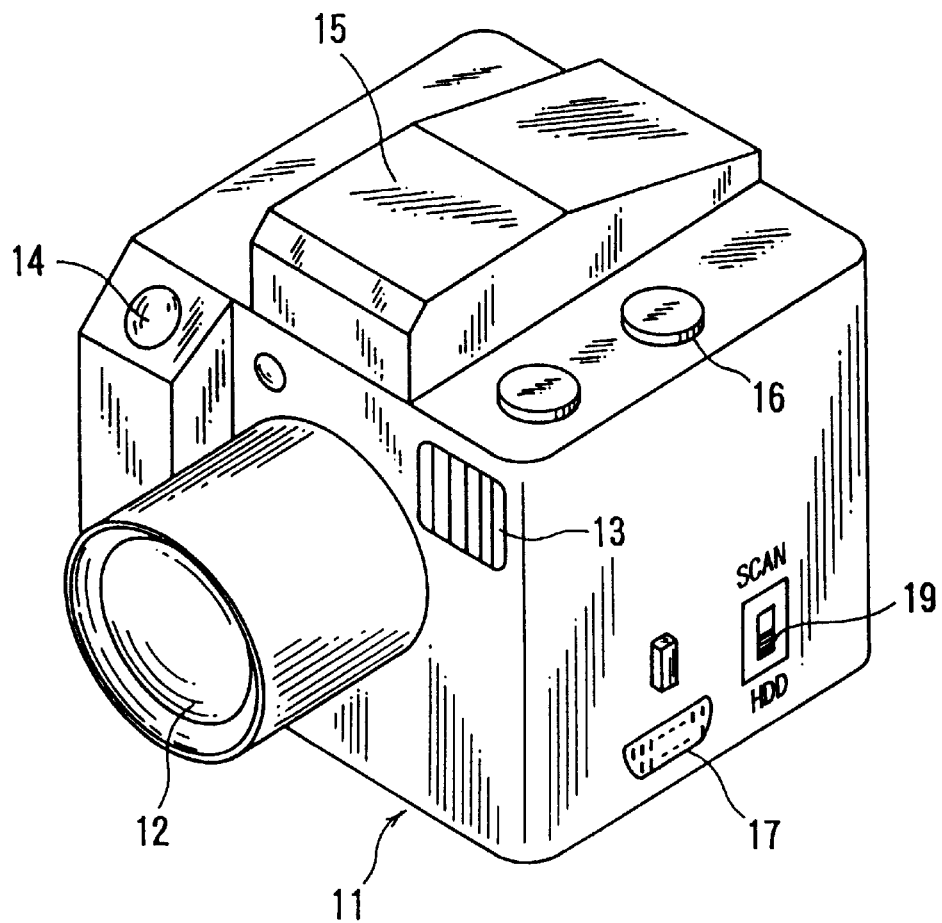
FIG. 29 is a perspective view of a still video camera having an image signal generating device of a sixth embodiment.

FIG. 29 is an external view of a still video camera having an image signal generating device of the sixth embodiment. Beside the output terminal 17, a mode switch 19 is provided to set an operation mode of the still video camera, as described later. Other constructions on the camera body 11 are the same as those of the first embodiment shown in FIG. 1. Further, the timing chart of a photographing operation and a reading operation is the same as that of the first embodiment shown in FIG. 7.

Figure 30:
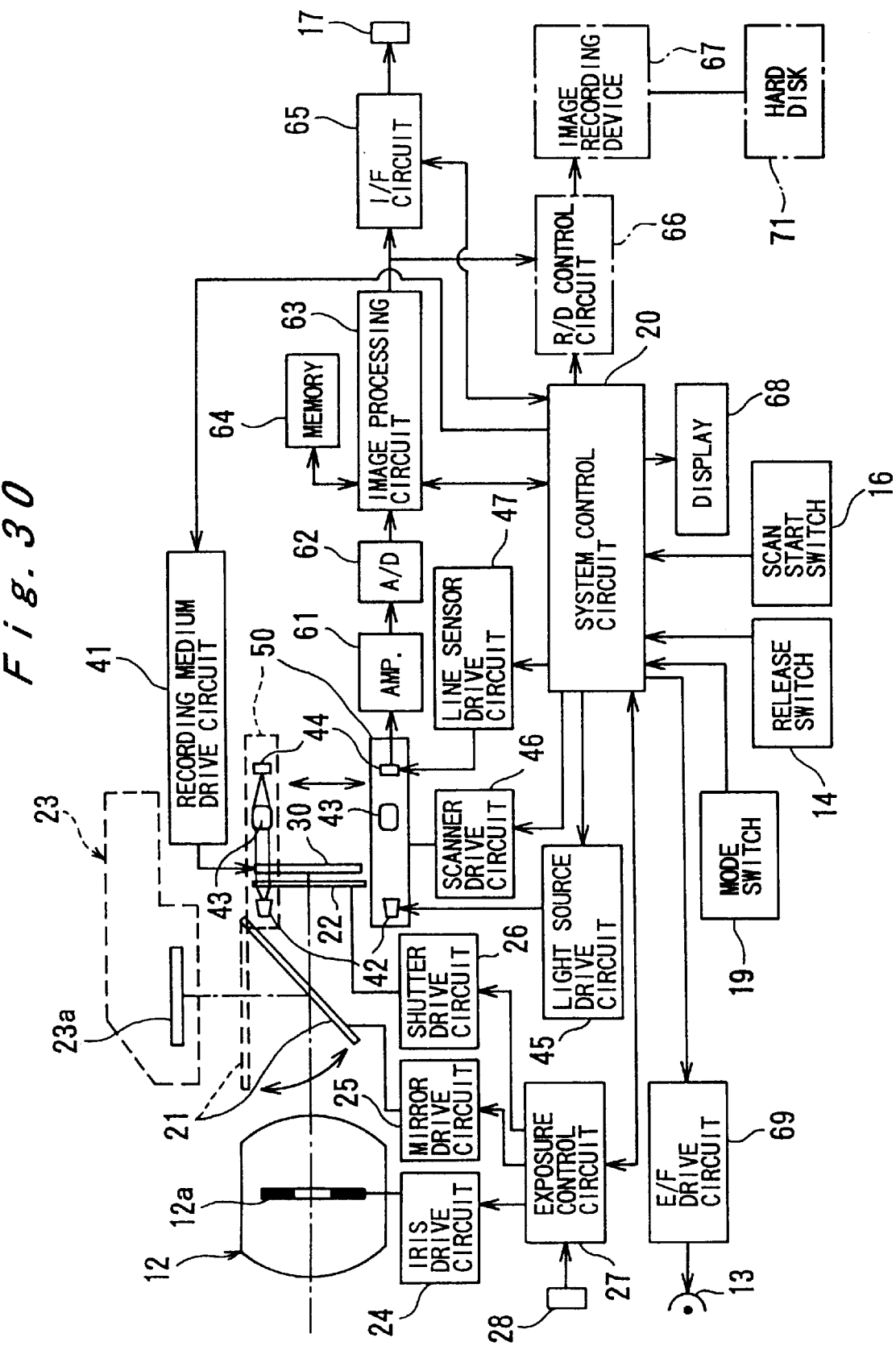
FIG. 30 is a block diagram of the still video camera of the sixth embodiment.

FIG. 30 is a block diagram of the still video camera of the sixth embodiment. In this drawing, a removable hard disk 71, which is a mass memory, can be mounted in the image recording device 67. The hard disk 71 can be used as an external memory for a computer provided outside the still video camera, and can be used for recording an image signal corresponding to an image developed in the electro-developing recording medium 30. The mode switch 19 is connected to the system control circuit 20 so that the operation mode can be switched between first and second modes. In the first mode, the hard disk 71 is used as the external memory for a computer connected to the still video camera through the output terminal 17. In the second mode, the image signal corresponding to an image developed in the electro-developing recording medium 30 is outputted from the still video camera through the output terminal 17, not through the hard disk 71.

Figure 31:
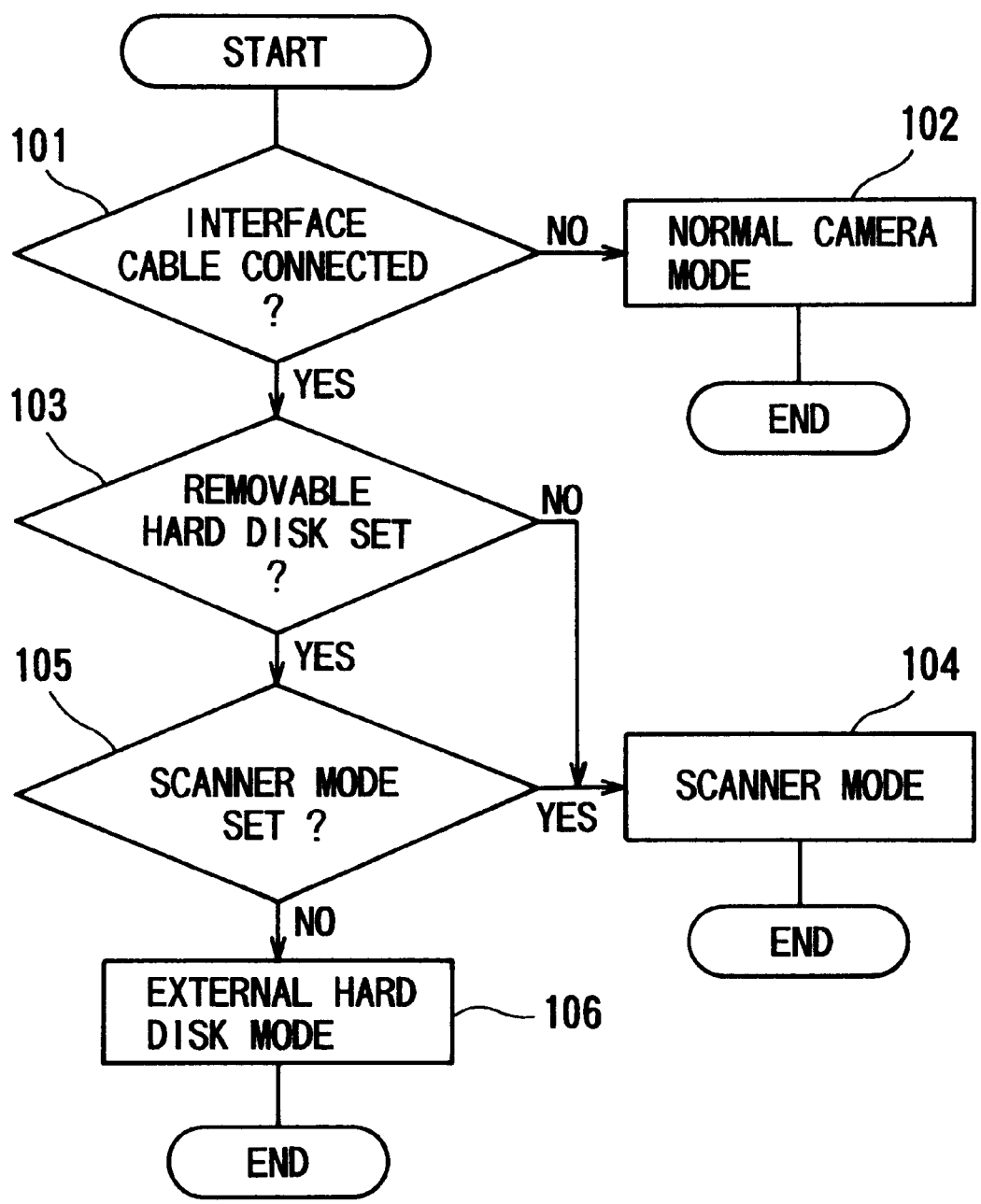
FIG. 31 is a flow chart showing an operation of the sixth embodiment.

The first mode, in which the still video camera is used as the external memory for the computer, will be described below with reference to a flow chart shown in FIG. 31.

The program shown in the flow chart is started by turning ON the electric power of the still video camera. In Step 101, it is determined whether or not an interface cable is connected to the output terminal 17, i.e., whether or not a computer is connected to the still video camera. Note that the determination in Step 101 is performed based on a voltage condition of a predetermined terminal included in the output terminal 17 which voltage is sensed by the system control circuit 20. When the interface cable is not connected to the output terminal 17, the process goes to Step 102 in which a normal camera mode is set so that the still video camera is used as a camera. Namely, an object image is formed on the electro-developing recording medium 30 through the photographing optical system 12 and recorded on the recording medium 30. Then, by turning ON the scan start switch 16, the image formed on the electro-developing recording medium 30 is read out through the line sensor 44, and an image signal corresponding to the image can be stored in storage medium, such an hard disk 71 or the mass memory, when it is detected that the storing medium is mounted in the image recording device 67.

Conversely, when it is determined in Step 101 that the interface cable is connected to the output terminal 17, it is determined in Step 103 whether or not the removable hard disk 71 is mounted in the image recording device 67. Namely, this hard disk 71 can be attached to and detached from the still video camera, and when the hard disk 71 is not attached in the image recording device 67, the process goes to Step 104 in which a scanner mode described below is set. Note that the determination in Step 103 is performed based on an operation in which the system control circuit 20 observes voltages of a connecting terminal through which the still video camera is connected to the hard disk through the recording device control circuit 66 and the image recording device 67.

In the scanner mode, the still video camera is used as a scanner by the external computer, which controls the still video camera to read an image recorded in the electro-developing recording medium 30, and outputs the image into a monitor provided in the computer. Namely, when using a SCSI interface, for example, the computer outputs an "INQUIRY" command to the still video camera, and the still video camera outputs data indicating that the scanner mode has been set, when the hard disk 71 is not set in the image recording device 67. Whereby, the computer recognizes that the still video camera is set to the scanner mode. On the other hand, in the still video camera, the scanning mechanism 50 is controlled in accordance with a "SCAN" command inputted from the computer, and a trimming operation is carried out in accordance with a "SET WINDOW" command, so that a necessary image is selected so that the necessary image is enclosed by a frame, and unused data is removed from the necessary image, and the resultant image signal is outputted to the computer.

When it is determined in Step 103 that the hard disk 71 is mounted in the image recording device 67, it is determined in Step 105 whether the mode switch 19 has been set to the first or second mode. When the mode switch 19 has been set to the first mode, Step 106 is executed, and when the mode switch 19 has been set to the second mode, Step 104 is executed. Namely, the second mode is the scanner mode.

In Step 106, the first mode, i.e., an external hard disk mode is set. In the external hard disk mode, the still video camera is used as an external memory for the computer. Namely, the computer outputs an "INQUIRY" command signal, for example, to the still video camera, and in accordance with this signal, the still video camera outputs data indicating that the external hard disk mode is set, due to the fact that the mode switch 19 is set to the first mode. Whereby the computer outputs command signals such as "READ CAPACITY" and "FORMAT UNIT" to the still video camera, so that the hard disk 71 is controlled. In this operation mode, a "SET WINDOW" command can not be received by the still video camera, so that the scanning operation and the triming operation are prohibited.

As describe above, according to the sixth embodiment, the large storage memory such as a hard disk mounted in the still video camera can be used by an external computer, and thus the working ratio of the large storage memory is improved.

Note that the electro-developing recording medium 30 is not restricted to the structure described above, and may be any other structure by which an image is electronically developed.

The present invention is not restricted to a single-lens reflex camera described above, but can be applied to a lens shutter camera. Note that, when the present invention is applied to the lens shutter camera, the shutter 22 need not be provided, as in the above described embodiment.

A single lens, a micro-lens array, a rod lens array and so on may be used for the scanner optical system 43.

Further, the recording medium mounted in the image recording device 67 may be a magnetic recording medium such as a hard disk or a magneto-optic recording medium such as a magneto-optic disc.

The line sensor 44 may be disposed in such a manner that a light beam reflected by the electro-developing recording medium 30 is sensed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 7-016551, 7-016552, 7-016553, 7-016554, 7-016555 and 7-016556 (filed on Jan. 6, 1995) which are expressly incorporated herein, by reference, in their entirety.

What is claimed is:

1. An image signal reading operation control device, comprising:

an electro-developing recording medium that electronically develops an image formed thereon;

a light source that illuminates said electro-developing recording medium, said light source comprising a plurality of light emitting light source elements;

a sensor that reads said image developed on said electro-developing recording medium that is illuminated by said light source, said sensor comprising a line sensor and generates pixel signals aligned in a longitudinal direction of said sensor, in accordance with said image read by said sensor; and a moving mechanism that moves said light source together with said sensor as a unit in a direction perpendicular to said longitudinal direction of said sensor;

a displacement mechanism that displaces said light source along said longitudinal direction with respect to said sensor while said sensor reads said image, such that a luminance deviation on a light receiving surface of said sensor is reduced.

2. A device according to claim 1, wherein said light source comprises a plurality of light-emitting diodes facing said line sensor.

3. A device according to claim 1, wherein said light source comprises a linear light-emitting diode extending parallel to said line sensor.

4. A device according to claim 1, wherein said light source is connected to said moving mechanism through said displacement mechanism.

5. A device according to claim 1, wherein said pixel signals are generated by an accumulating operation in which an electric charge is accumulated in said line sensor, said displacement mechanism displacing said light source in accordance with said accumulating operation of said line sensor.

6. A device according to claim 5, wherein said displacement mechanism displaces said line sensor in a first direction while said accumulating operation is performed, and displaces said line sensor in a second direction opposite to said first direction while said accumulating operation is not performed.

7. A device according to claim 5, wherein said displacement mechanism displaces said line sensor while said accumulating operation is performed, and stops said line sensor while said accumulating operation is not performed.

8. A device according to claim 1, wherein said light source comprises a plurality of light-emitting diodes, an amount of displacement of said light source by said displacement mechanism being approximately equal to a distance between two adjacent light-emitting diodes.

9. A device according to claim 1, wherein said light source comprises a plurality of light-emitting diodes, an amount of displacement of said light source by said displacement mechanism being approximately equal to half of a distance between two adjacent light-emitting diodes.

10. A device according to claim 1, wherein said electro-developing recording medium comprises an electrostatic information recording medium that generates an electric charge in accordance with an image formed thereon, and an electric charge keeping medium which generates a visible image in accordance with said electric charge and which can keep said visible image.

11. A device according to claim 10, wherein said electric charge keeping medium comprises a liquid crystal display having a memory-type liquid crystal.

12. The device according to claim 1, said light source and said sensor being positioned on opposite sides of said electro-developing recording medium.

13. The image signal reading operation control device according to claim 1, said displacement mechanism reducing luminance deviation resulting from said plurality of light source elements.

14. An image signal reading operation control device, comprising:

an electro-developing recording medium that electronically develops an image formed thereon;

a line sensor that senses said image developed on said electro-developing recording medium, said line sensor generating pixel signals aligned in a longitudinal direction of said line sensor, in accordance with said image sensed by said line sensor;

a moving system, said moving system moving said line sensor in a scanning direction different from said longitudinal direction, said line sensor being moved from a first position to a second position, corresponding to two adjacent scanning lines, by said moving system;

a reading system, said reading system reading out said pixel signals from said line sensor when said line sensor reaches said second position; and a controller that controls a moving speed at which said line sensor is moved by said moving system, said controller changing said moving speed while said line sensor is moved from said first position to said second position, said moving speed at which said line sensor is moved being periodically changed by said controller while said image developed on said electro-developing recording medium is sensed by said line sensor.

15. A device according to claim 14, wherein said controller increases said moving speed in such a manner that said moving speed at said second position is higher than said moving speed at said first position.

16. A device according to claim 15, wherein said controller linearly increases said moving speed.

17. A device according to claim 14, wherein said controller outputs a drive pulse to control said moving speed, said drive pulse having a frequency in accordance with which said moving speed is changed, said frequency being increased as said line sensor is moved from said first position to said second position.

18. A device according to claim 14, wherein said electro-developing recording medium comprises an electrostatic information recording medium that generates an electric charge in accordance with an image formed thereon, and an electric charge keeping medium which generates a visible image in accordance with said electric charge and which can keep said visible image.

19. A device according to claim 18, wherein said electric charge keeping medium comprises a liquid crystal display having a memory-type liquid crystal.

20. The device according to claim 14, further comprising a light source that illuminates said electro-developing recording medium, said light source and said line sensor being positioned on opposite sides of said electro-developing recording medium.

21. An image signal reading operation control device, comprising:

an electro-developing recording medium that electronically develops an image formed thereon;

a stationary light source that outputs parallel light, said parallel light illuminating said electro-developing recording medium;

a mirror disposed in front of said electro-developing recording medium so that the parallel light output by said stationary light source is led to said electro-developing recording medium;

a shutter disposed in front of said electro-developing recording medium such that said mirror is disposed between said shutter and said electro-developing recording medium, said shutter opening and closing to control an amount of said light led to said electro-developing recording medium, said mirror and said light source being positioned between a plane containing a surface of said shutter and a plane containing a light receiving surface of the electro-developing recording medium;

a line sensor positioned opposite to said mirror with respect to said electro-developing recording medium, said line sensor sensing said light passing through said electro-developing recording medium; and a scanning mechanism that moves said mirror together with said line sensor as a unit in a scanning direction, said scanning direction extending along an optical path of the parallel light from said stationary light source towards said mirror and being different from a longitudinal direction of said line sensor.

22. A device according to claim 21, wherein said line sensor and said mirror are positioned at a same height.

23. A device according to claim 21, wherein said mirror comprises a total reflecting mirror.

24. A device according to claim 21, wherein said mirror comprises a half-mirror, said shutter having a reflecting surface facing said electro-developing recording medium, said light led to said electro-developing recording medium being reflected by said mirror and said reflecting surface prior to being led to said electro-developing recording medium.

25. A device according to claim 21, wherein said electro-developing recording medium comprises an electrostatic information recording medium that generates an electric charge in accordance with an image formed thereon, and an electric charge keeping medium which generates a visible image in accordance with said electric charge and which can keep said visible image.

26. A device according to claim 25, wherein said electric charge keeping medium comprises a liquid crystal display having a memory-type liquid crystal.

* * * * *